United States Patent [19]

Tsuchida et al.

[11] Patent Number: 5,317,727
[45] Date of Patent: May 31, 1994

[54] METHOD APPARATUS FOR DETERMINING PREFETCH OPERATING FOR A DATA BASE

[75] Inventors: Masashi Tsuchida, Tokyo; Kazuhiko Ohmachi, Kawasaki; Toshio Honma, Yokohama; Yasuhiro Imai, Hadano; Nobuo Kawamura, Ebina, all of Japan

[73] Assignees: Hitachi Software Engineering co., Ltd., Yokohama; Hitachi, Ltd., Tokyo, both of Japan

[21] Appl. No.: 353,698

[22] Filed: May 17, 1989

[30] Foreign Application Priority Data

May 19, 1988 [JP] Japan .................. 63-120478

[51] Int. Cl.⁵ .................. G06F 15/403
[52] U.S. Cl. .................. 395/600; 395/425; 364/DIG. 1; 364/282.1; 364/239; 364/239.4
[58] Field of Search ... 364/200 MS File, 900 MS File; 395/600, 425, 700, 275, 375

[56] References Cited

U.S. PATENT DOCUMENTS

| | | | |
|---|---|---|---|
| 3,898,624 | 8/1975 | Tobias | 364/200 |
| 4,422,145 | 12/1983 | Sacco et al. | 364/200 |
| 4,509,119 | 4/1985 | Gumaer et al. | 364/200 |

OTHER PUBLICATIONS

Smith, Alan Jay, "Sequentiality and Prefetching in Database Systems," ACM Transactions on Database Systems, vol. 3, No. 3, Sep. 1978, pp. 223-247.
Chou et al., "An Evaluation of Buffer Management Strategies for Relational Database Systems," Proc. of the 11th Conference on VLDB 1985, pp. 127-141.
Sacco et al., "A Mechanism for Managing the Buffer Pool in a Relational Database System using the Hot Set Model," Proc. of the 8th International Conference on VLDB 1982, pp. 257-262.

Primary Examiner—Paul V. Kulik
Attorney, Agent, or Firm—Antonelli, Terry, Stout & Kraus

[57] ABSTRACT

In a data base processing method including a central processing unit for analyzing a plurality of queries made from a plurality of users so as to determine an internal processing procedure with respect to a data base, and for performing the internal processing procedure; a secondary storage for storing data capable of being shared by each user; and, an input/output controlling processing unit including at least one cache storage, for controlling a transfer of a plurality of records which are required for input/output processing operations between the central processing unit and secondary storage. The data base processing method is featured in that a decision is made whether or not a prefetching operation is carried out at a start of an input/output processing operation by judging the internal processing procedure which has been formed by the query; a retrieval range into which a record to be fetched has been stored is formed when the prefetching operation is performed; and, a prefetching record number is determined as an input/output processing demand unit, taking account of an access characteristic of the internal processing procedure and also a system characteristic containing a size of the cache storage, a performance, of the central processing unit, and a traffic of the input/output processing unit.

18 Claims, 16 Drawing Sheets

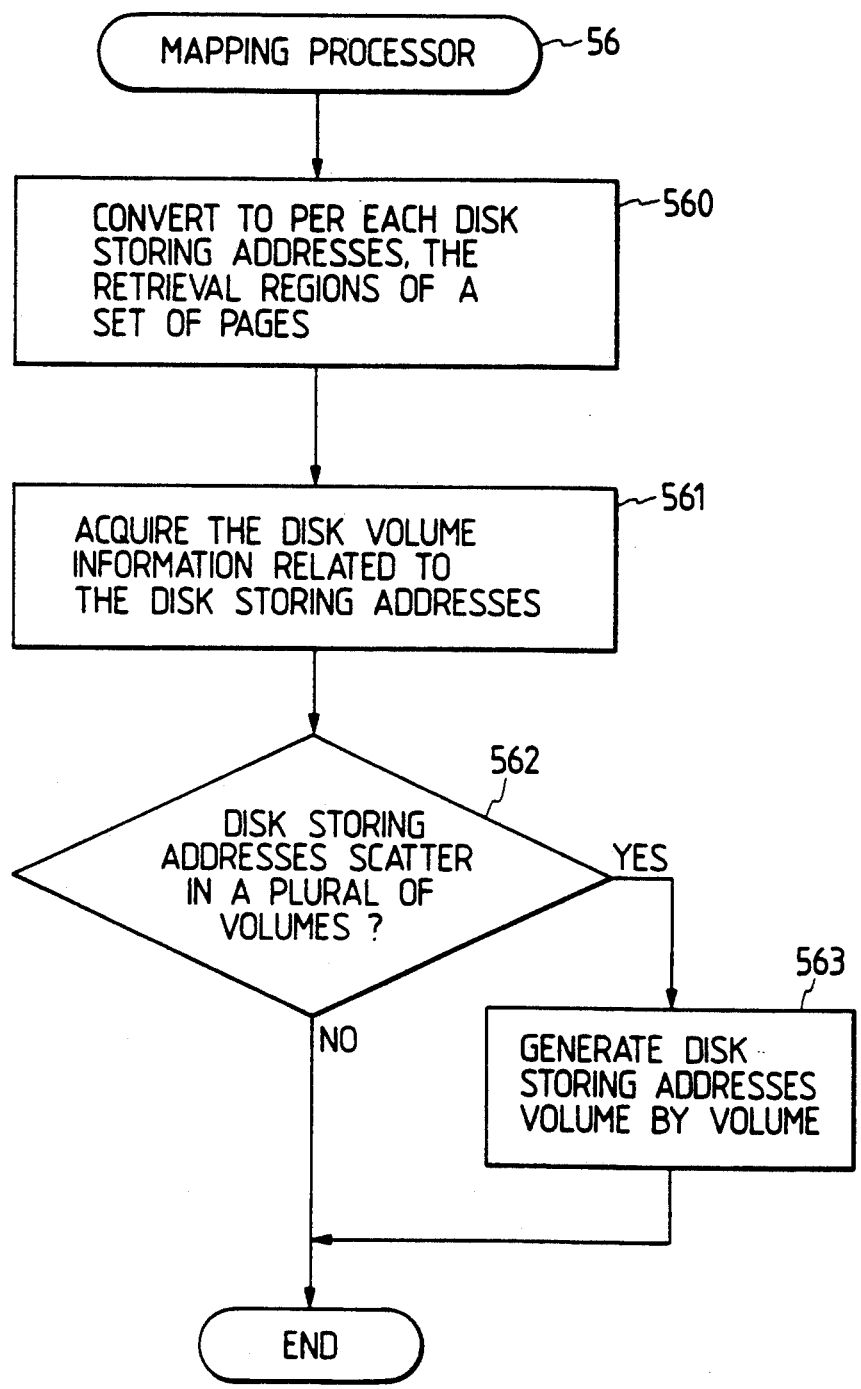

METHOD APPARATUS FOR DETERMINING PREFETCH OPERATING FOR A DATA BASE

BACKGROUND OF THE INVENTION

The present invention relates to an apparatus and method for processing data in a data base in a computer system.

It should be noted that a data base is arranged according to a relation viewed by a user as a two-dimensional table type, and a line of this two-dimensional table corresponds to a tuple. Also, the tuple is constructed by more than one attribute (referred to as a column).

In data base processing, for instance, a relational data base process, data to be processed is present in a secondary storage (an external memory device, such as a magnetic disk device). A large quantity of data must be read, and transferred with respect to each of a number of data base operations. When a large amount of data is required to be transferred in such a data base system, the required amount of data transfer time deteriorates the performance of the data base system.

To this end, one method has been proposed for efficiently utilizing the time period during which the data is transferred from the secondary storage. That is, the data transfer time period is overlapped with another time period during which the data base is processed. This technique is well known in the art. In general, since the capacities of both a program and data greatly exceed an extension of a main storage capacity, a concept of a current storage architecture is indispensible.

Also, in most data base management systems, in particular a relational data base management system (simply referred in as a "DBMS" hereinafter), a buffer (data base buffer) in a main storage is utilized to hold a copy of a partial data base which has been stored into a secondary storage in order that the input/output processing time is shortened. If the data to be processed, which has already been fetched into the data base buffer of the above-described main memory, still remains after the data process processing, in case the data is again needed, the input/output processing to the secondary storage with the higher access cost is no longer required, resulting in an improvement in the performance of the entire system. However, as the memory capacity of the data base buffer is restricted, a replacement of the content is required, so that the replacement algorithm produces an influence on the system performance. As a consequence, a selection basis for determining which data should be maintained in the data base buffer is important when the data is replaced therein. As one selection basis, for instance, the LRU algorithm (Least Recently Use Algorithm) has been proposed. This algorithm is based upon the assumption that the longer a time period for the data from the last access to the present access becomes, the smaller is the possibility for further access of the data. However, in the normal data base processing, since there is data sequential access processing and data random access processing, the above-described assumption may not be satisfied in all specific cases. As a result, it is not useful in the data base buffer to rely upon the simple LRU algorithm. Since the input interrogation is analized to form an internal processing procidure in the relational DBMS, it is possible to determine the data base reference characteristics. As conventional techniques to solve the above-described problems by using the characteristics information, DBMIN, HOT set model or the like have been proposed.

For example, reference is made to Chou, H., and DeWitt, D. J. "An Evaluation of Buffer Management Strategies for Relational Database Systems" Proc. of the 11th Conf. on VLDB 1985, pages 127-141, and Sacco, G. M., and Schkolnick, M. "A Technique for Managing the Buffer Pool in a Relational System Using the Hot Set Model" Proc. of the 8th Conf. on VLDB 1982, pages 257-262.

In addition, another conventional approach has been well known such that an input/output device including a cache storage is arranged between a main storage the a secondary storage so as to shorten an input/output process time. This cache storage operates to read data of a secondary storage, as a whole, which is stored closely to a record that is input/output in a plurality of record units. Then, if a processing type may be assumed in which there is a high probability to store the record just after the access demand in the cache storage, the input/output processing time can be considerably reduced. That is to say, it is very useful in the central processing unit of DBMS if predictable data can be prefetched and stored into the cache storage when accessed. As previously described, however, since the sequential access processing mode is mixed with the random access processing mode, it is found that the input/output processing time becomes long due to the various read miss operations according to the conventional control method of the cache storage.

In accordance with the above-described conventional techniques, there is no clear proposal that the cache storage is actively scheduled while utilizing the access characteristics predicable in DBMS, so as to shorten the input/output time.

Also, in a system in which a plurality of users simultaneously refer to a data base, the data predictably being referred to is input-processed in the cache storage by overlapping the data transfer time period (containing the seek time period and read time period of the secondary storage) with a time period required for data-base-processing the data in the central processing unit (CPU), whereby the input/output processing time can be essentially shortened. However there is a demand that a high-speed response is required to an interrogation from a user. In addition, in accordance with an internal processing procedure formed by this user's interrogation, since the input/output processing times for the prefetching process which is predicted by the access characteristic of the internal processing procedure are greatly different, there is another problem in the conventional method where the data is read based upon a predetermined prefetching record unit that unnecessary data is prefetched uselessly and also necessary data is not prefetched. Furthermore, it is found that the throughput of the entire system cannot be guaranteed unless the prefetching record number as the input/output process demand unit, or the page number is determined in accordance with the system characteristics representative of a size, a multiplicity and a CPU performance of the cache storage, and a traffic of each input/output processing device.

On the other hand, in a DBMS, there has been proposed a buffer management system based on QLSM (Query Locality Set Model), in which buffers are divided and managed in response to a data base query demand. In this buffer management system, a buffer having a proper size is divided from all of the buffers with respect to the data base query, a replacement algorithm suitable for the data base reference pattern of the query thereof is determined, and the input/output operations of the data are managed for each of the divided buffer groups, i.e., locality sets. If the data page in the locality set of a certain data base query is desired to refer to another data base query, this page is transferred to a locality set of another data base query other than the demanded one. Accordingly, there is a drawback that in this case, the buffer which has stored the data page in question destroys the replacement algorithm of a locality set of a certain data base query.

In the above-described conventional techniques, there are problems that in case that the same data page is referred to in response to a plurality of data base queries, the processing time required for receiving and transferring the data between the buffers of the respective locality sets is increased, the buffer search processing time within other locality sets is increased when there is no data in a locality set itself, and the system cannot depend upon the replacement algorithm of the respective locality sets.

SUMMARY OF THE INVENTION

A primary object of the present invention is to provide a data base processing method and a data base processing apparatus where a useless prefetching operation is omitted, and the necessary data is surely prefetched so as to reduce the input/output processing time, so that the performance of the overall system can be improved.

A second object of the present invention is to provide a data base processing method and a data base processing apparatus where both the buffer receive/transfer processing time between the locality sets and buffer search processing time are reduced, and furthermore, buffer management can be performed in such a way that the substitute algorithm of the respective locality sets is not destroyed.

To achieve the above-described primary object, a first feature of the present invention is to analyze a query from a user, to determine an access characteristic with respect the data base in accordance with a formed internal processing procedure, the size and multiplicity of cache storages are scheduled, a judgement is made as to whether or not a prefetching operation is to be carried out at a start of an input/output process, and a prefetching process unit is determined as a whole by a system characteristic or the like.

To attain the above-described second object, a second feature of the present invention concerns a case in which a starting operation occurs in buffers between locality sets, and calls for providing a common page management table for managing the shared buffers, the common page management table being assembled into the locality set at the sharing side while maintaining the table at the locality set having the buffer to be shared, and the position information of the shared buffer is set into the common page management table.

BRIEF DESCRIPTION OF THE DRAWINGS

FIGS. 1 to 4 relate to a first preferred embodiment of the present invention, in which FIG. 1 is a schematic block diagram of a data base of a DBMS to which the present invention has been applied; FIG. 2 is a functional diagram of a data base system to which the present invention has been applied; FIG. 3 is a structure diagram of hardware to which the present invention is applied; and, FIGS. 4a to 4i are flowcharts for explaining processes of the DBMS to which the present invention has been applied; and FIGS. 5 to 8 relate to a second preferred embodiment of the present invention, in which FIG. 6 is a diagram for indicating a process flow of an input/output buffer managing unit shown in FIG. 5; FIG. 7 is a diagram for representing a shared page managing method of a shared page controlling process shown in FIG. 6; and FIG. 8 is a diagram for showing another shared page managing method shown in FIG. 7.

DETAILED DESCRIPTION OF THE PREFERRED EMBODIMENTS

Figure 1:
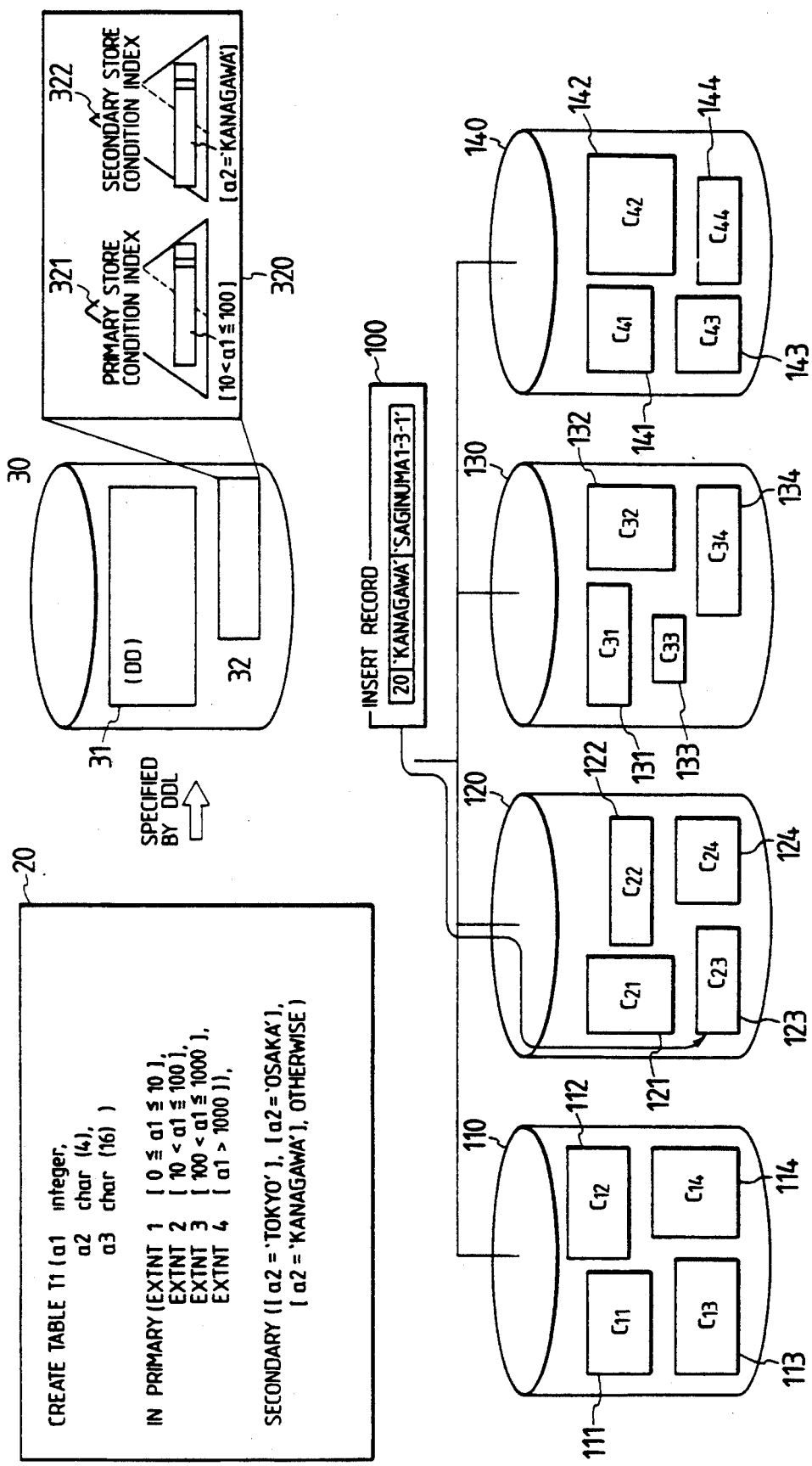

A description will now be made of preferred embodiments according to the present invention with reference to drawings.

First Preferred Embodiment

First of all, a first preferred embodiment of the present invention will be summarized.

(1). In a data process of a computer system according to the invention, comprising a central processing unit for analyzing a plurality of queries made from a plurality of users so as to determine an internal processing procedure with respect to a data base, and for executing the internal processing procedure; a secondary storage for storing data capable of being shared by each user; and an input/output processing unit including at least one cache storage, for controlling a transfer of a plurality of records which are required for input/output processing operations between the central processing unit and the secondary storage, a decision is made as to whether or not a prefetching operation is to be carried out at a start of an input/output processing operation by judging the internal processing procedure which has been formed by the input query; a retrieve range into which a record to be read has been stored is formed when the prefetching operation is performed; and, a number of prefetching records is determined as an input/output processing demand unit, taking account of an access characteristic of the internal processing procedure and also system characteristics such as the size of the cache storage, a performance(processing speed and so on) of a central processing unit (referred to as a "CPU" hereinafter), and a traffic of each input/output processing unit.

For instance, to determine whether or not the prefetching operation is to be carried out, a decision is made that the prefetching operation is interrupted under the following conditions. That is to say, the traffic condition is very busy, the data processing is concentrated at a specific user, or the succeeding query and demand utilize a part of the record by the preceding query and demand. When a decision is made that the prefetching operation is to be carried out, the number of prefetching records as the above-described input/output processing demand unit is on the order of 12 pages in a normal condition (if 1 page corresponds to 4k bytes, then on the order of 48k bytes). However, the prefetching unit (page number) within one time is increased under the following conditions. That is to say, the size of the cache storage becomes large, the performance of CPU is improved, the traffic of the input/output unit is lowered, or the storage range of the required data is extended in accordance with the data store condition corresponding to the query contents by the users. In the cache storage, the record store region can be established whose range corresponds to this prefetching unit.

(2). In accordance with a concrete example of the present invention, respective record store regions are maintained in the cache storage for every query made by a user, and the prefetching operation is carried out based upon the designated retrieve range.

(3). A concurrency control is performed by previously executing a lock process for a plurality of prefetched records in the cache storage. As a consequence, while the read operation is carried out for a certain user, no access by other users is allowed.

(4). A region into which at least a plurality of prefetching records are fetched is maintained in the data base buffer of the main storage. After the record of this region is read out, the unnecessary records of this region are controlled to be sequentially replaced by subsequent prefetching records.

(5). An address series for storing a record which satisfies a given retrieve condition equation is stored in the cache storage. Another address series for storing pages containing only a record which does not satisfy the given retrieve condition equation is stored therein. Another address series for storing records which could not evaluate the given retrieve condition equation due to the overflow of the records or the like is stored therein. A further address series for storing pages containing at least more than one record which can satisfy the given retrieve condition equation is stored therein. A result for editing records, which satisfies the given retrieve condition equation into a page form with only a designated field is stored therein, and also only a page for satisfying the given retrieve condition equation is stored in the cache storage. It should be noted that the overflow corresponds to a record portion which has been stored into other different pages since it cannot be stored in a predetermined page of the disk apparatus, and the address of this page has been stored into the cache storage as a local memory CPU fetches the above-described given page upon receipt of a report on an occurrence of an overflow, and thereafter performs the above-explained analysis by fetching the record of the overflow. The records which cannot satisfy the condition equation are unlocked (released) and are accessible by other users (input/output demand).

(6). Also, a record is previously clustered using a key value range, or a hush evaluation value so as to be stored; each region for storing records clustered using the above-described key value range, or hash evaluation value, is addressed; meta data such as an index and the like as the respective key value ranges or hash values being a key is maintained for management purposes; and, a record storing range to be retrieved is determined by utilizing the meta data.

It should be understood that the cluster corresponds to a set of plural pages and is indicated as a store condition index unit as will be described later in more detail with reference to FIG. 1.

(7). Moreover, an address representative of a record store range to be retrieved is subdivided into a parallel-accessible record address series, and an input/output process demand is issued by employing this record address series.

An operation based on the above-described arrangement will now be described.

According to the data base processing method of the above-described feature (1) of the present invention, depending upon the access characteristic predicted by the DBMS, and the system characteristics such as the size of the cache storage, the performance of the CPU, and the traffic of the input/output processing unit, one or a plurality of record store regions are maintained for every user's query on the cache storage. Then, the prefetching record number is determined in such a manner that the data input/output processing time period can be overlapped with the processing time period for requiring the data base processing operation of the data (such a manner that both the data base processing time period by CPU and the input/output processing time period from the input/output unit to the input/output control unit are balanced, both of these processing operations are carried out in parallel, and thereby there is no idle time between the successive input/output processing operations, or the successive data base processing operations). Furthermore, the prefetching process is efficiently performed so that the input/output processing time can be considerably shortened, and therefore the throughput of the entire system can be increased.

Referring now to the drawings, a first preferred embodiment of the invention will be described.

FIG. 1 shows an example of a data base store of a DBMS to which the present invention has been applied. It should be noted that an explanation of FIG. 1 will be discussed later.

Figure 2:
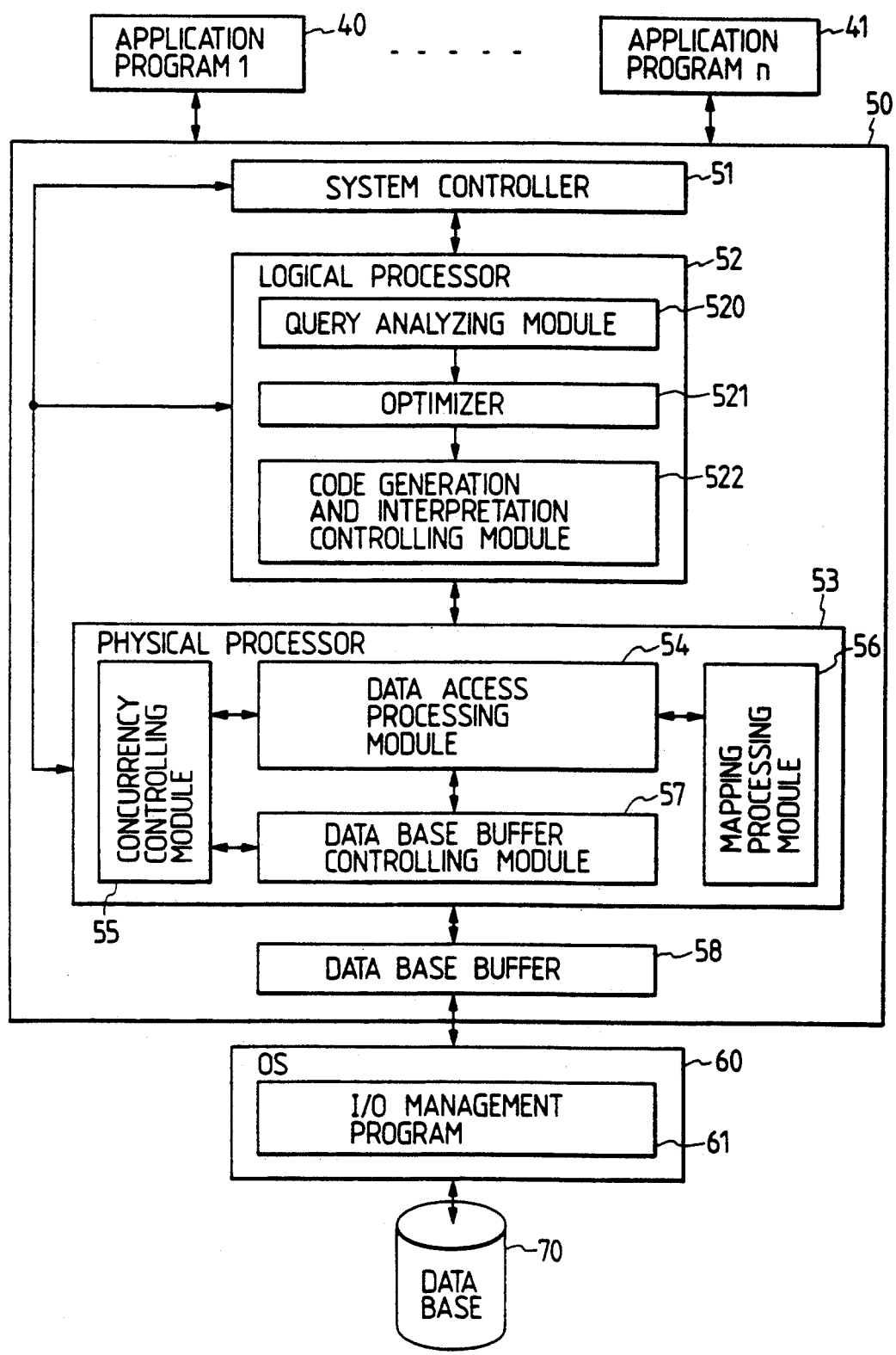

FIG. 2 is a diagram for representing a functional arrangement of a data base system to which the present invention has been applied.

The data base system is constructed of application programs 40, 41 (referred to as an "AP") formed by a user; DBMS 50 for managing an overall data base system such as a query processing operation and a resource management; an operating system 60 (referred to as an "OS") for handling a management of an overall system of an input/output managing program 61 for reading/writing the data which are to be input/output; and, a data base system 70 for storing the data which is to be processed in the data base.

The above-described DBMS 50 is arranged by a system control unit 51 for performing input/output management or the like in addition to the management and control of the overall system; a query analyzing module 520 for performing a syntax analysis of a query and a semantics analysis thereof; a logic processing unit 52 constructed of an optimization module 521 for producing a proper processing procedure and also a record generation and interrupting module 522 for generating an internal record and for analyzing this record; a data base buffer controlling module 57 for managing a data base buffer 58 (in a main storage) for storing the data to be processed by DBMS 50; a data access processing module 54 for realizing a condition judgement and an editing of the accessed data; and a physical processing module 53 including a concurrency controlling module 55 for realizing a concurrency control of a resource shared by a system and a mapping processing module 56 for mapping from a logical data base space (page access space) to a physical data base space (disk access space).

Figure 3:
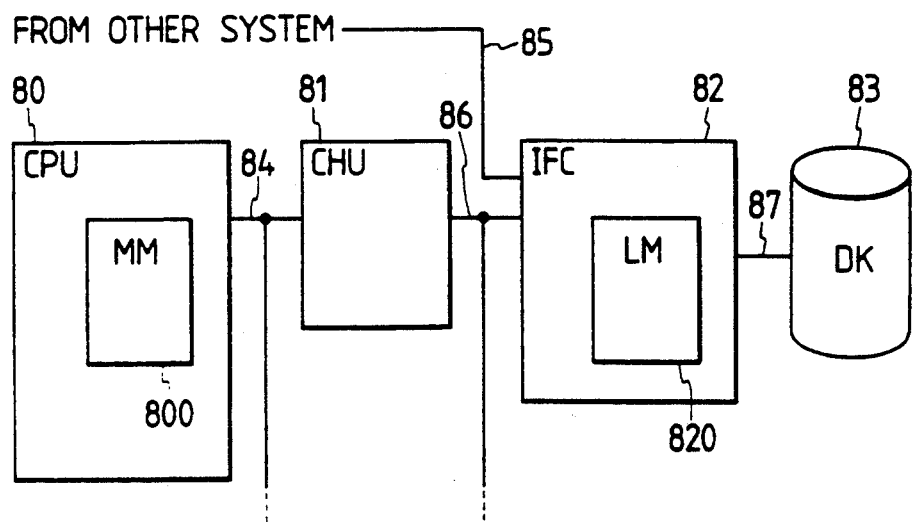
Figure 4A:
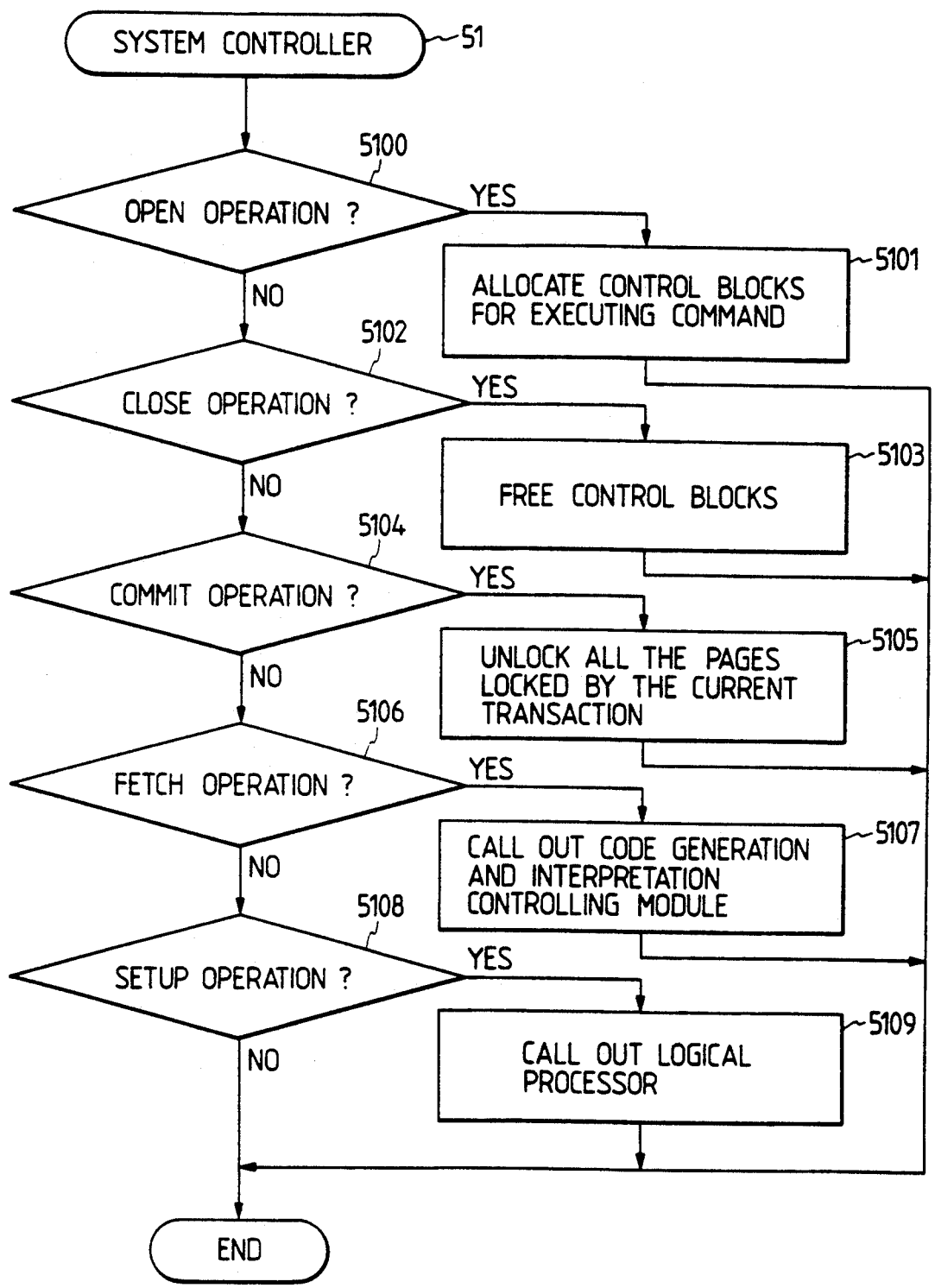
Figure 4B:
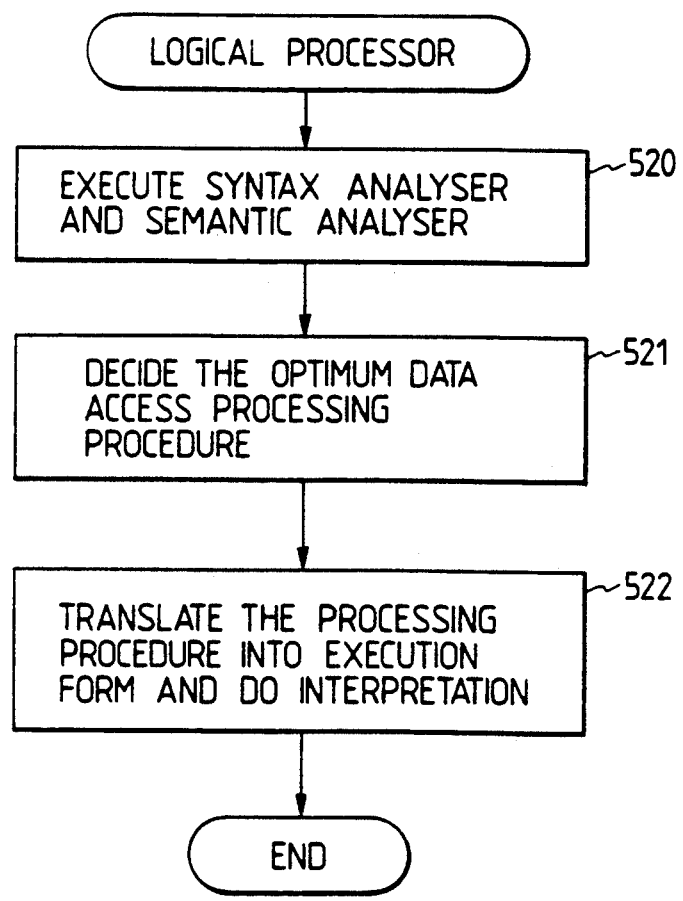
Figure 4C:
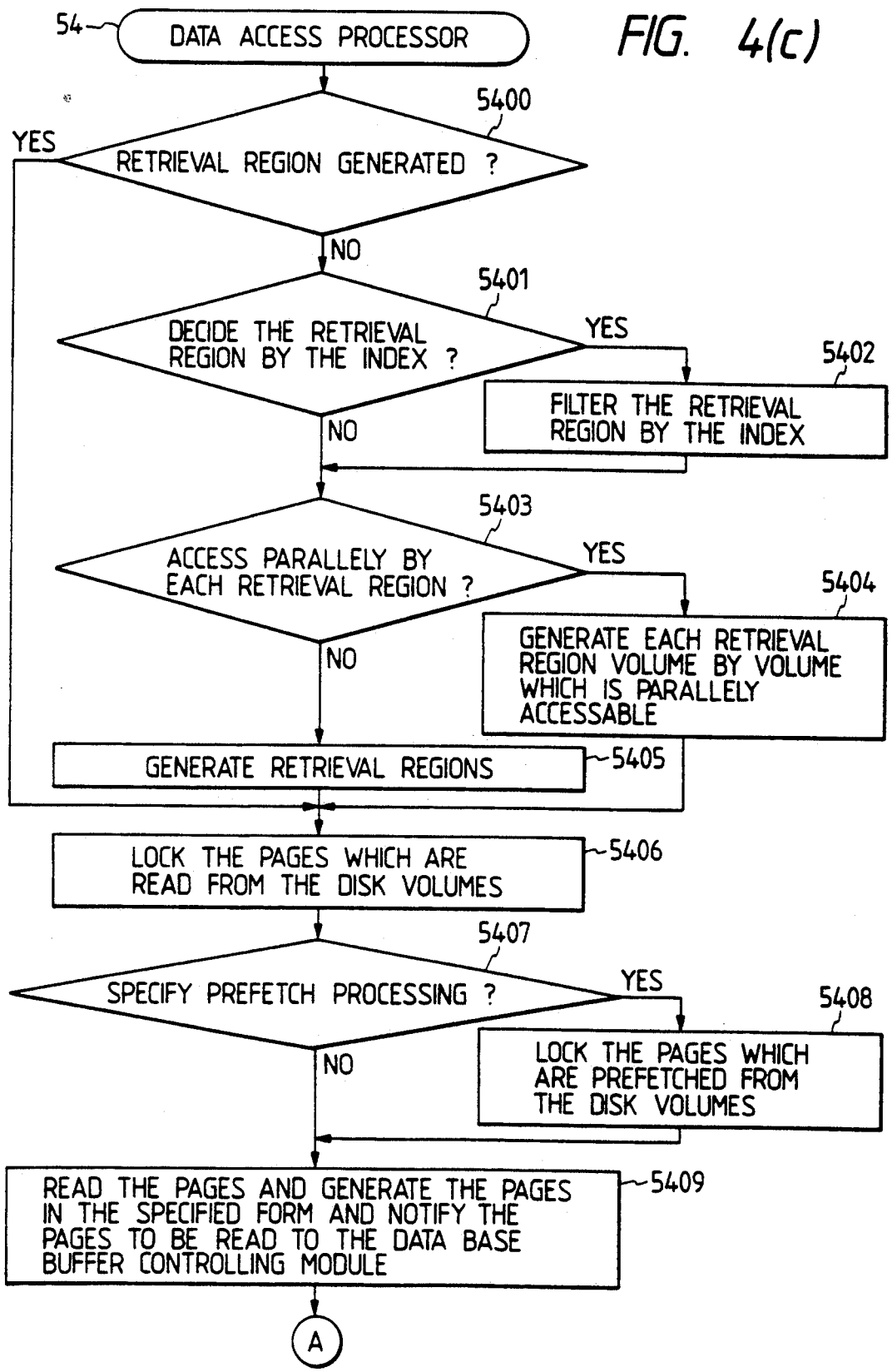
Figure 4D:
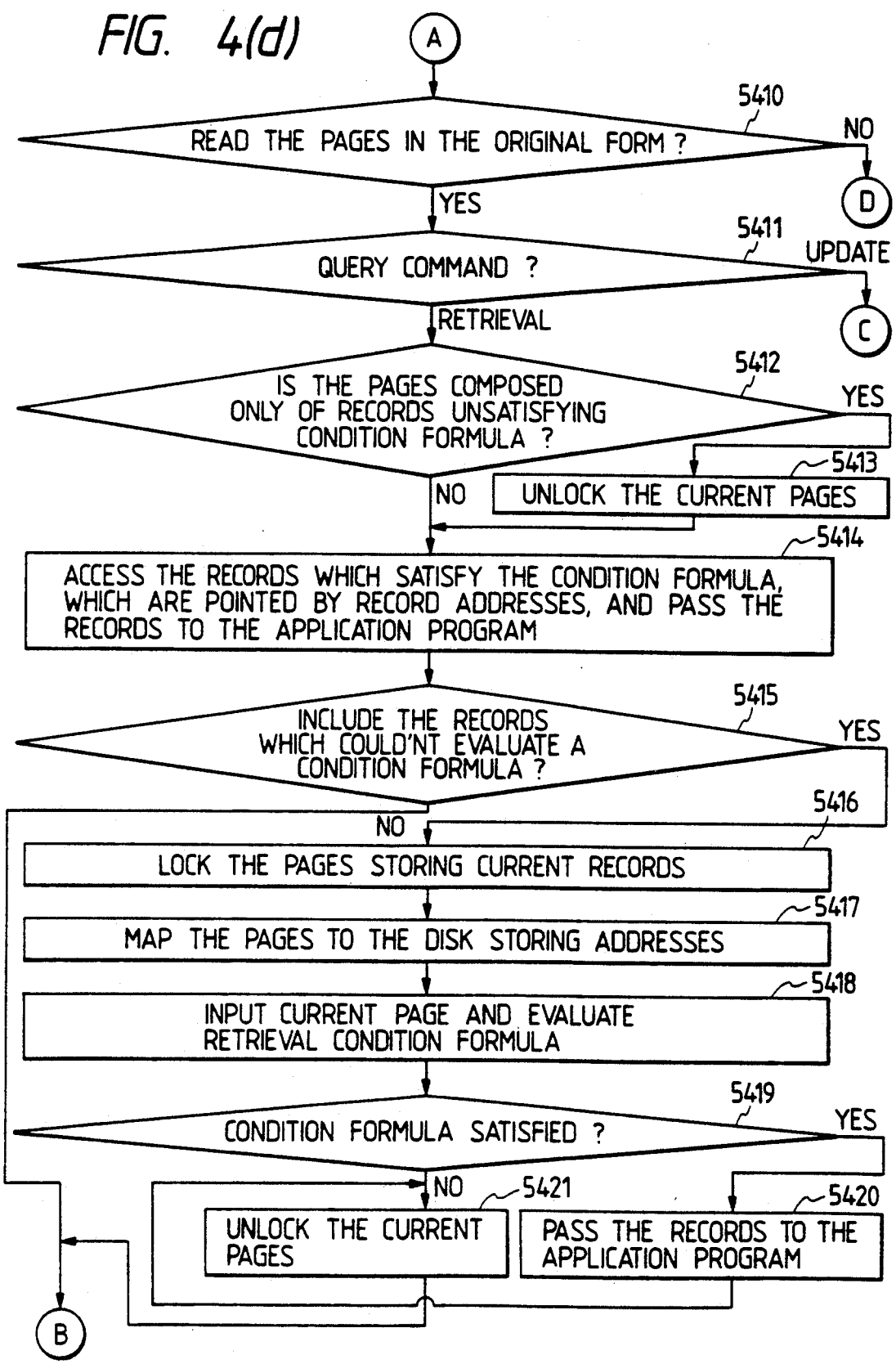
Figure 4E:
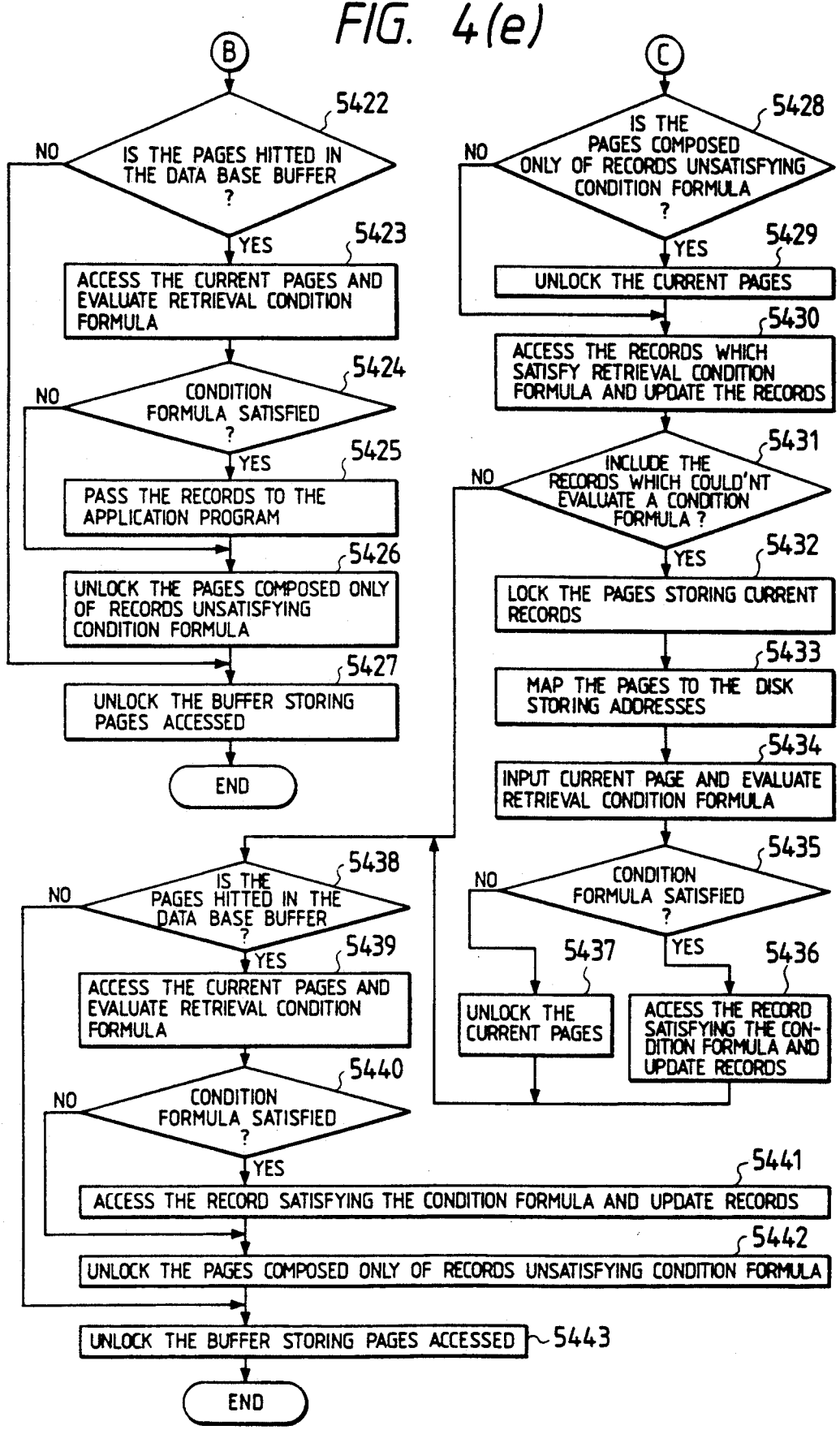
Figure 4F:
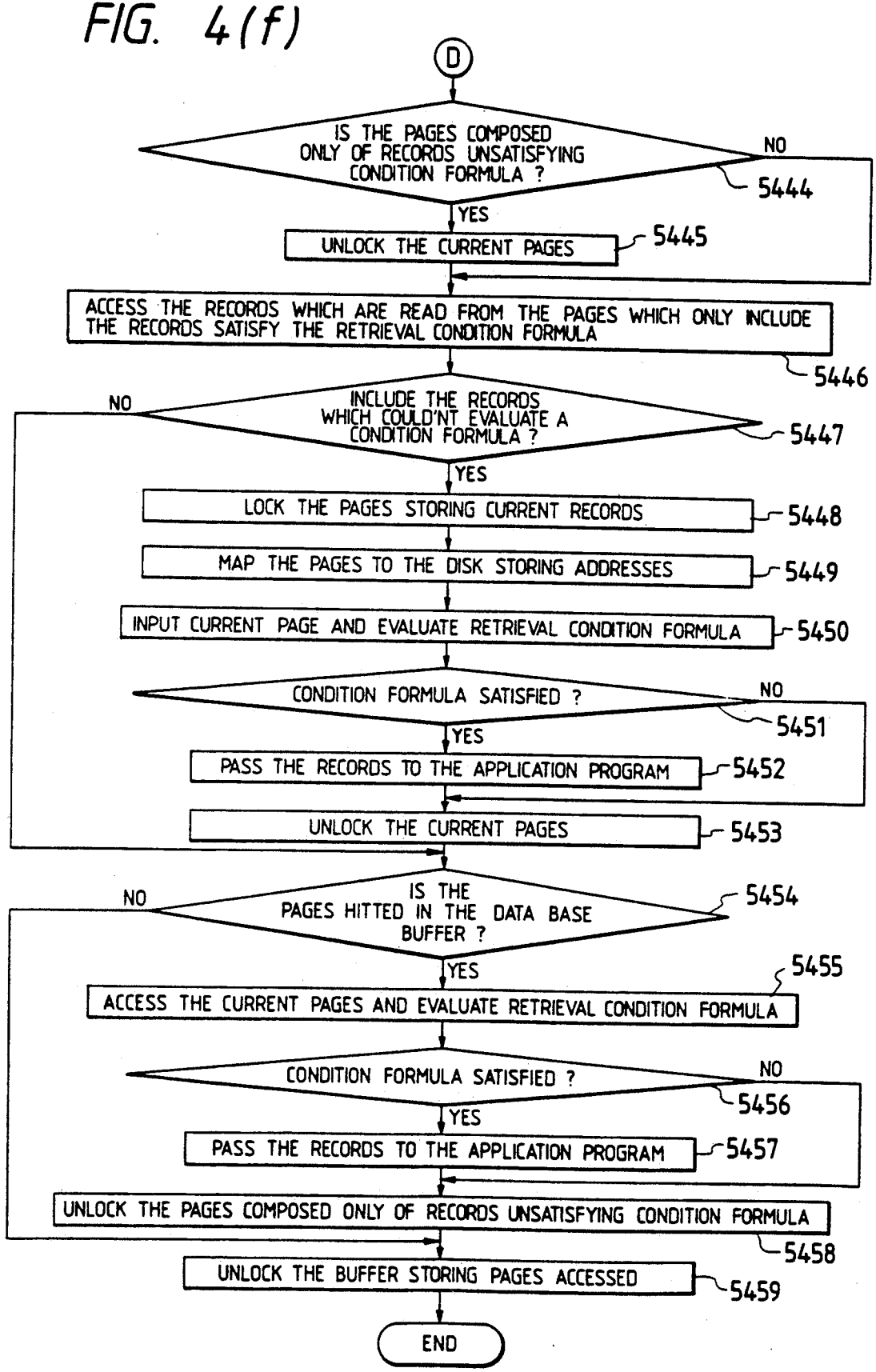
Figure 4G:
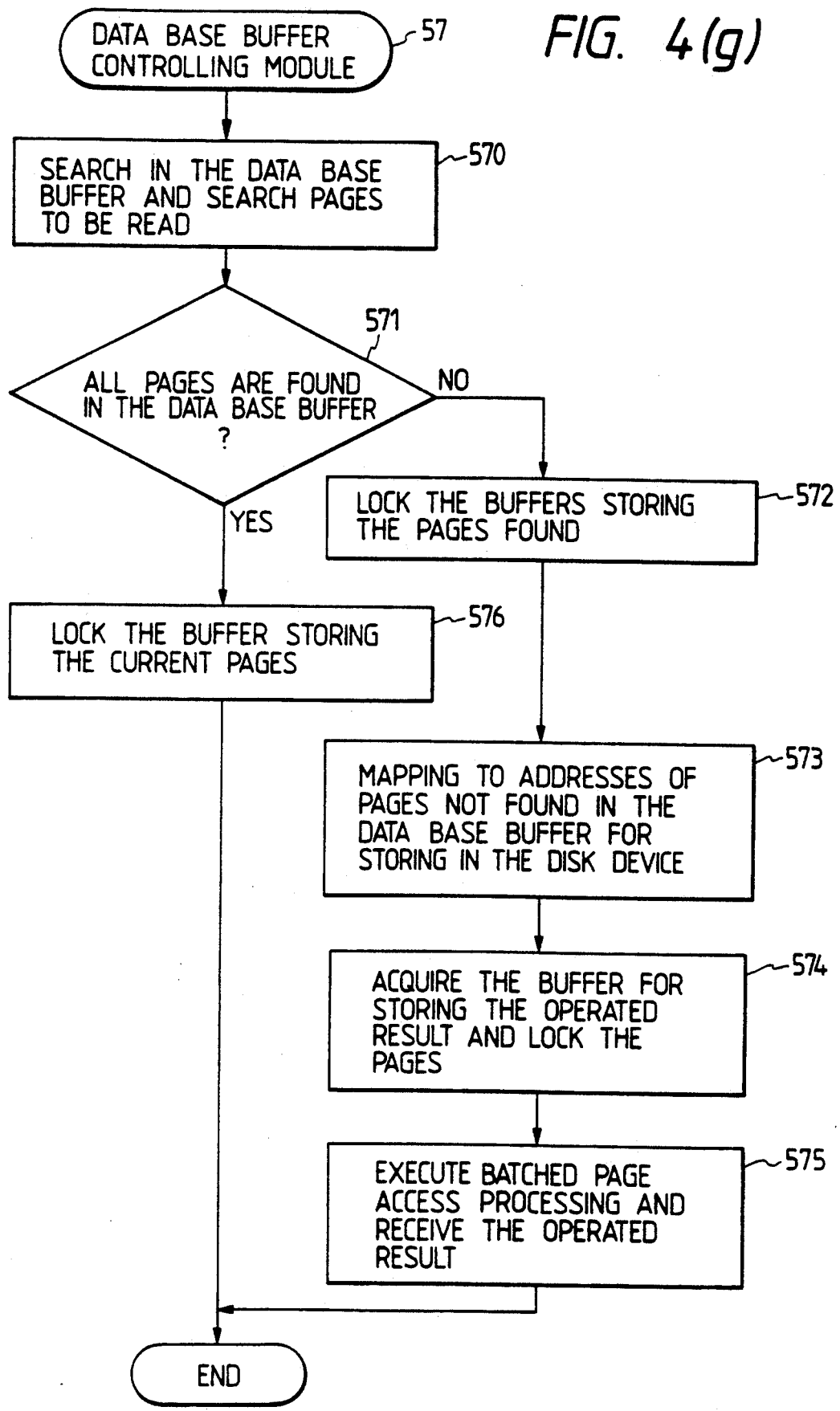
Figure 4I:
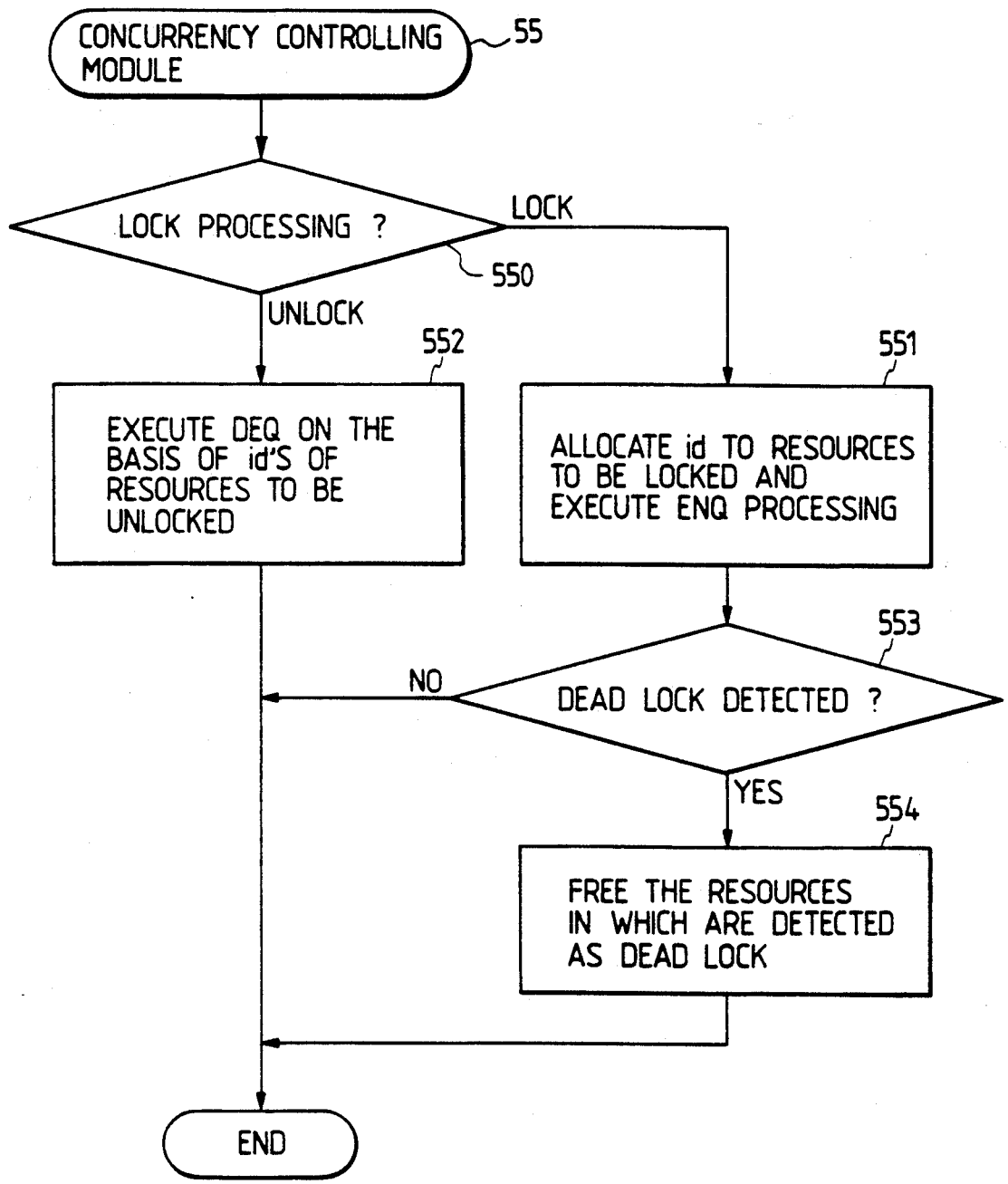

FIG. 3 is a diagram for showing a hardware arrangement to which the present invention has been applied. More specifically, it includes a central processing unit (CPU) 80 for holding a main storage (MM) 800; a channel unit (CHU) 81 for performing an input/output control; an intelligent file controlling module (IFC) 82 (this intelligent file controlling module 82 corresponds to the above-described input/output controlling module), for holding a local memory 820 (this local memory 820 corresponds to the above-described cache storage) that sets the data which are processed for selection, restriction, projection (only a specific field is abstracted from the respective records, for instance, only an address is abstracted from the respective records having the fields of income, name, address and ages), and connection or the like during the data base processing operation; and also a disk 83 (this disk 83 corresponds to the above-described secondary storage).

Between the intelligent file controlling module 82 and disk 83, both the relative block address and input/output data are transferred by employing a path 87. Between the channel module 81 and intelligent file controlling module (IFC) 82, both the filtering process result and retrieve condition are transferred by employing paths 85 and 86. Further, between the central processing unit 80 and channel module 81, a path 84 is utilized for the data transfer and control data exchange. A plurality of channel modules (not shown) and intelligent file controlling modules (not shown) may be connected to the paths 84 and 86. The path 85 shows how the intelligent file controlling module 82 cooperates with other systems (not shown)

The method according to the above-described arrangement is different from a method that is executed by DBMS 50 where all of the data base processing operations are realize in the central processing unit 80. That is to say, among the data base processing operations, the relational algebra calculations corresponding to the internal processing record generated in the record generation and interrupting module 522 of DBMS 50, namely various calculations such as selection, restriction, projection and connection are executed by utilizing the function of the intelligent file controlling module 82. This results from the fact that various calculation functions (for instance, filtering process module) are added to the input/output module.

A basic operation will now be described as follows.

(1). The query entered from the application programs 40 and 41 is analyzed in DBMS 50 so as to determine the processing procedure.

(2). In accordance with the processing procedure, the relational algebra is extracted, and the process demand is issued to the intelligent file controlling module 82.

(3). The intelligent file controlling module 82 interprets the process demand, and the physical input/output demand is issued to the disk 83. In the data base 70, the data is stored in a relational form, and a page as a managing unit of this data base is fetched in synchronism with the data transfer to be set in the local memory 820.

(4). Such calculations as selection restriction, projection, and connection are performed for the data stored in the local memory 820 and the filtering process is executed.

(5). The processing results are set to the data base buffer 58 of DBMS 50.

(6). DBMS 50 edits the processing results and outputs the query result to the application programs 40 and 41.

An arrangement shown in FIG. 1 will now be described. FIG. 1 shows an example of the data base store of DBMS in the data base system to which the present invention has been applied. This is constructed of a store condition indication 20 for controlling store positions of the respective records constituting the data base; management information 30 of DBMS such as a data dictionary 31, a directory 32 and the like; store extents 110, 120, 130, and 140 for storing the data base 70; and, an insert record 100 as an additional record. The directory 32 includes a primary store condition index 321 for managing a pointer which designates clusters stored in the respective store extents 110, 120, 130, and 140 in accordance with the setting of the store condition indication 20, and a store condition index 320 constructed of a secondary store condition index 322 and the like. In accordance with the store condition indication 20, the clusters 111, 112, 113, and 114 are set to the store extent 110, the clusters 121, 122, 123, and 124 are set into the store extent 120; the clusters 131, 132, 133, and 134 are set into the store extent 130; and the clusters 141, 142, 143, and 144 are set to the store extent 140. Both these store extents and clusters are employed as a means for restricting a fetching range of the data to be accessed. That is, based upon the condition equation indicated by the query command, a judgement is made as to whether or not the store condition index 320 can be applied. If possible, then the respective store extent and cluster corresponding to the fetching range are determined by employing the primary store condition index 321 and secondary store condition index 322.

The above-described operations will now be explained with reference to a concrete example. In the store condition indication 20, a table T1 is certified by columns a1, a2, and a3. Also it is represented that if the column a1 is equal to $0 \leq a1 \leq 10$, the column a1, i.e., numerical data such as an annual income and an age is stored into the store extent 110; if the column a1 is $10 < a1 \leq 100$, then it is stored into the store extent 120; if the column a1 is $100 \leq a1 \leq 1000$, it is stored into the store extent 130; and if the column a1 is $a1 > 1000$, then it is stored into the store extent 140. Further, if the column a2 is equal to a2=TOKYO, then it is stored into the clusters 111, 121, 131 and 141. If the column a2 is a2=OSAKA, it is stored into the clusters 112, 122, 132 and 142. If the column a2 is a2=KANAGAWA, then it is stored in the clusters 113, 123, 133 and 143. If the column a2 is equal to a value other than the above-described values, then it is stored into the clusters 114, 124, 134 and 144. Now, it is assumed that the data representative of an insert record 100 is added. In this record, the column a1 corresponds to 20, the column a2 corresponds to "KANAGAWA", and the column a3 corresponds to "SAGINUMA 1-3-1". Since it is found that this data should be stored into the cluster 123 of the store extent 120 in accordance with the store condition indication 20 by employing the primary store condition index 321 and secondary store condition index 322 of the store condition index 320, they are inserted into this position and then the process is accomplished. Similarly, the updating process and deleting process of the record are executed.

Next, a retrieve process will now be described.

Case 1: access of the data of a1=20.

(i). The primary store index 321 is accessed by keying a1=20.

(ii). It is determined that the data to be retrieved has been stored into the store extent 120.

(iii). The clusters 121, 122, 123 and 124 of the store extent 120 are accessed.

Case 2: access of the data of "KANAGAWA".

(i). The secondary store index 322 is accessed by keying a2=KANAGAWA(ii).

(ii). It is determined that the data to be retrieved has been stored into the clusters 113, 123, 133 and 143.

(iii). The cluster 113 of the store extent 110, the cluster 123 of the store extent 120, the cluster 133 of the store extent 130, and the cluster 143 of the store extent 140 are accessed.

Case 3: access of the data of a1=20 and also a2=-KANAGAWA.
 (i). The primary store index 321 is accessed by keying a1=20.
 (ii). The secondary store index 322 is accessed by keying a2=KANAGAWA.
 (iii). The results of the previous items (i) and (ii) are merged under an AND condition, and it is acquired that the data to be retrieved has been stored into the cluster 123.
 (iv). The cluster 123 of the store extent 120 is accessed.

The features of this preferred embodiment are as follows. The data range to be fetched by the store condition index 320 can be localized. When the data range to be fetched extends over a plurality of extents, the data can be accessed in parallel. Furthermore, since the respective store extents store the data as a cluster unit, a plurality of pages can be accessed by only one input/output demand.

An overall explanation of DBMS in which this feature could be realized will now be described.

FIG. 4 is a flowchart for explaining a process of DBMS to which the present invention has been applied. A detailed operation relating to this flowchart will now be described. Although not shown in this figure, the prefetching operation should be applied to all steps defined in the flowchart of FIG. 4.

The system controlling module 51 allocates control blocks and the like necessary for a demand if a process demand received from the application program corresponds to an open demand (steps 5100-5101); releases the control blocks and the like necessary for a demand if a process demand corresponds to a close demand (steps 5102-5103), unlock-processing executes all pages which are under the lock at this transaction if a process demand corresponds to a commit demand (steps 5104-5105); calls the record generation and interrupting module 522 if a process command corresponds to a fetch demand (steps 5106-5107); and calls the logical processing module 52 if a process demand is a set-up demand (steps 5108-5109). Then the system controlling unit 51 accomplishes these processes.

The logical processing module 52 executes the syntax analysis and semantics analysis of the query command (step 520); determines the optimal data access processing procedure (step 521); expands this processing procedure and interprets and executes it (step 522); and accomplishes the processes.

The physical processing module 53 is constructed of a data access processing module 54, a data base buffer controlling module 57, a mapping processing module 56, and a concurrency controlling module 55.

The data access processing unit 54 advances to 5406 if retrieve range information of the data to be fetched has been formed. If not yet formed, then a check is made as to whether or not the retrieve range can be defined based upon the store condition index 320 (step 5401). If yes, then the retrieve range is defined based on this store condition index 320 (steps 5401-5402-5403).

Although not shown in the figure, the records are previously clustered and stored by either the key value range or hash evaluation value, each of the clustered store ranges is addressed, the meta data such as an index where this key value range or hash evaluation value is a key is maintained and managed. In a step 5402, the record store range to be retrieved is defined by employing the above-described meta data. Then, an indication is made that the retrieval ranges extend over a plurality of clusters in response to the store condition index, in other words, a check is made as to whether or not the data can be accessed in parallel (step 5403). If yes, based on the cluster information (address of the store condition index 320 in question) a retrieval range is formed at a parallel-accessible disk volume unit (the record address is divided) (steps 5403 - 5404 - 5406). If no, a retrieval range is formed (steps 5403 - 5405 - 5406). In the steps 5405 and 5404 (in a parallel accessible case), a prefetching record number is determined in accordance with the system characteristic. As parameters, based upon the access characteristic, and system characteristic such as the performance of the CPU, the cache size, and the traffic of the input/output unit, the results which were previously analyzed and evaluated, have been assembled in the system. The record number is determined during the execution by employing this result. The record number is set to a small value in such a manner that when, for instance, the traffic is increased, an influence given to the on-line process becomes low. When the performance of the CPU (the CPU step number per a predetermined time, normally $10^6$ instructions/second are employed) is increased, the record number is set to a large value. In addition, the more the access characteristic is improved (the shorter the access time becomes), and the larger the cache size becomes, the record number is set to a larger value. Thereafter, pages where are input-processed are locked (step 5406), and pages which are prefetch-processed are locked if there is a prefetch processing indication by the input process demand (steps 5407 - 5408 - 5409). Furthermore, the pages which are input-processed are fetched, the data form and calculation result information which are designated by the input process demand are formed. Then, the pages which are prefetch-processed are announced and then the process is advanced to the following processes (step 5409).

Case 1: The data form which has been designated by the input process demand corresponds to a part or all of original pages (steps 5410-5411).

Case 1.1: The query command is retrieved (steps 5411-5412).

If the pages are constructed of only the records which do not satisfy the condition formula among the pages to be input-processed, these pages are to be unlocked (steps 5412 - 5413 - 5414). On the other hand, the respective records are accessed by employing the record address series for indicating the records which satisfy the condition formula, and the data is fetched to the application program (step 5414). If the pages to be input-processed are fetched and the condition formula evaluation designated by the input process demand cannot be effected by the overflow or the like of the records (step 5415), the pages for storing the records are locked by employing the record address series which designates the records where the condition formula evaluation cannot be done (step 5416). Then, the disk store address series for storing the pages in question is formed (step 5417), the data in question is accessed, the retrieve condition formula is evaluated, the data form designated by the input processing demand and calculation result information are formed (step 5418), and if the pages are constructed of the records which do not satisfy the equation formula (step 5419), the pages in question are unlocked (steps 5419 - 5421 - 5422). Also, the records which satisfy the equation formula are accessed and the data are fetched to the application program (steps 5420–5421). If the pages to be input-processed are not hit by the buffer, the buffer for storing the accessed pages in the above-described process is unlocked (steps 5422–5427), and the process is ended. If yes, then the pages which have hit the buffer are accessed, the retrieval condition equation is evaluated, the data form designated by the input processing demand and the calculation result information are formed (step 5423), and if the pages are constructed of only the records which do not satisfy the condition formula (step 5424), the pages in question are unlocked (steps 5424 - 5426 - 5427). Also, the records which do not satisfy the condition formula are accessed and the data are fetched to the application program (steps 5425 - 5426). Finally, the buffer for storing the accessed pages in the above-described process is unlocked (step 5427) and the process is accomplished.

Case 1.2 = The query command is updated (steps 5411–5428).

When the pages are constructed of only the records which do not satisfy the condition formula among the pages to be input processed, the pages in question are unlocked (steps 5428 - 5429 - 5430). The respective records are accessed by employing the record address series for designating the records which satisfy the condition formula so as to update the records (step 5430). If the pages to be input-processed are fetched and the condition formula evaluation designated by the input process demand cannot be effected by the overflow or the like of the records (step 5431), the pages for storing the records are locked by employing the record address series which designates the records where the condition formula evaluation cannot be done (step 5432). Then, the disk store address series for storing the pages in question is formed (step 5433), the data in question is accessed, the retrieve condition formula is evaluated, the data form designated by the input processing demand and calculation result information are formed (step 5434), and if the pages are constructed of the records which do not satisfy the equation formula (step 5435), the pages in question are unlocked (steps 5435 - 5437 - 5438). Also, the records which satisfy the equation formula are accessed and the record updating process is executed (steps 5436–5438). If the pages to be input-processed are not hit by the buffer, the buffer for storing the accessed pages in the above-described process is unlocked (steps 5438–5443), and the process is ended. If yes, then the pages which have hit the buffer are accessed, the retrieval condition equation is evaluated, the data form designated by the input process demand and the calculation result information are formed (step 5439), and if the pages are constructed of only the records which do not satisfy the condition formula (step 5440), the pages in question are unlocked (steps 5440 - 5442 - 5443). Also, the records which do not satisfy the condition formula are accessed and the record updating process is executed (steps 5441–5442). Finally, the buffer for storing the accessed pages in the above-described process is unlocked (step 5443) and the process is accomplished.

Case 2: The data form designated by the input process demand edits the pages (steps 5410–5444).

When the pages are constructed of only the records which do not satisfy the condition formula among the pages to be input processed, the pages in question are unlocked (steps 5444 - 5445 - 5446). By employing the data where only the records for satisfying the condition formula have been stored in a page form, the respective records are accessed, and the data is fetched to the application program (step 5446). If the pages to be input-processed are fetched and the condition formula evaluation designated by the input process demand cannot be effected by the overflow or the like of the records (step 5447), the pages for storing the records are locked by employing the record address series which designates the records where the condition formula evaluation cannot be done (step 5448). Then, the disk store address series for storing the pages in question is formed (step 5449), the data in question is accessed, the retrieve condition formula is evaluated, the data form designated by the input processing demand and calculation result information are formed (step 5450), and if the pages are constructed of records which do not satisfy the equation formula (step 5451), the pages in question are unlocked (steps 5451 - 5453 - 5454). Also, the records which satisfy the equation formula are accessed and the data is fetched to the application program (steps 5452–5453). If the pages to be input-processed are not hit by the buffer, the buffer for storing the accessed pages in the above-described process is unlocked (steps 5454 –5459), and the process is ended. If yes, then the pages which have hit the buffer are accessed, the retrieval condition equation is evaluated, the data form designated by the input process demand and the calculation result information are formed (step 5455), and if the pages are constructed of only the records which do not satisfy the condition formula (step 5456), the pages in question are unlocked (steps 5456 - 5458 - 5459). Also, the records which do not satisfy the condition formula are accessed and the data is fetched to the application program (steps 5457–5458). Finally, the buffer for storing the accessed pages in the above-described process is unlocked (step 5459) and the process is accomplished.

The data base buffer controlling module 57 searches the data base buffer 58 so as to retrieve the pages which are to be input-processed. If all of the pages to be input-processed are searched, the buffer for storing the pages in question is locked (steps 571–576) and then the process is ended. If not, then only the buffer for storing the found pages is locked after the data base buffer 58 is searched (step 572). The pages which have not been found as a result of the above-described search are converted into the disk store address series (step 573); the buffer for storing the data form designated by the input process demand and the calculation result information is acquired; this buffer is locked (step 574); the input/output processing demand is issued for the input/output management program 61 of OS 60; both the data form designated by the input process demand and the calculation process result such as the calculation result information is fetched (step 575), and the process is advanced. It should be noted that in the step 574, a region to fetch a plurality of records which are at least prefetched to the data base buffer in the main memory is maintained, whereas in the step 570, after the records in this region are read out, the unnecessary portion of this region is controlled to be sequentially replaced by different prefetch records. In a step 575, one or a plurality of record store regions are maintained in the cache storage for each user's query due to the input processing issued. Further, in this step 575, as a part of the calculation processing result, a storage is performed in such a way that the respective address series and pages (of the records which satisfy the given retrieval condition formula, the records which do not satisfy it, the records which are not evaluated, the pages containing more than one satisfied record, and the results for editing the satisfied records only to the designated field in the page form) are transferred from IFC 82.

The mapping processing module 56 converts into the disk store address series based upon the retrieval range given as the pages (step 560); obtains volume information from the disk store address series from the present pages (step 561); forms the disk store address series at each volume unit when the present disk store address series crosses over a plurality of volumes (steps 562-563), and accomplishes the process.

The concurrency controlling module 55 allocates an identifier to a resource to be unlocked if an unlock processing is required, and performs a DEQ processing (unlock process) (steps 550-552). If a lock processing is required, the identifier is allocated to the resource to be locked so as to execute an ENQ processing (unlock and lock processing) (steps 550-551). However, if the dead lock is detected, the resources which are to be processed for the dead lock purpose are released (steps 551 - 553 - 554).

The above-described operations are a processing flow according to the preferred embodiment of the invention.

In accordance with the preferred embodiment, the data base processing method and apparatus may be realized by way of a software system of a powerful computer, or a multiple processor system in which an exclusive processor is prepared for the various processing units.

According to the data base processing method of the preferred embodiment, the access characteristic of the user's query, the size of the cache storage, and multiplicity thereof are scheduled, a judgement is made as to whether or not the prefetching operation is performed at a start of input/output processing, the CPU process is overlapped with the input/output process by determining the prefetch process unit based upon the system characteristics as a whole so as to schedule the data in parallel. As a result, the input/output process can be realized based upon the access time of the cache storage, not the access time of the external secondary storage (disk apparatus), and therefore there is a particular advantage that the performance of the overall system can be improved. In addition, if a judgement is made that the input/output process operations of a plurality of input/output modules can be performed in parallel based upon the storage condition of the data, the input/output process operations are executed in parallel. As a consequence, the input/output processing time can be further reduced.

Second Preferred Embodiment

A second preferred embodiment will now be summarized.

In the second preferred embodiment of the invention, there are provided a locality set management table for managing a specification of the locality set corresponding to the data base query; a page management table for managing page information and position information of a buffer, which are stored in the buffer for each buffer in the locality set; and a common page management table (i.e., table for managing shared buffers) for indicating that when the shared pages are produced, no actual page (i.e., buffer containing the pages) is held to the locality set at the sharing side, but the shared page is referred to. When the shared pages are produced among a plurality of locality sets, the common page management table is chained into the shared locality set based upon the replacement algorithm;

(1) a management table for stacking the position information of the common page management table is provided to the page management table in the locality set which holds the buffer for storing the shared pages;

(2) both head position information and an end position information of a common page management table group are held in the page management table in the locality set having the buffer for storing the shared page, and management is carried out by chaining the common page management table groups in such a manner that the common page management table group sets the position information before and after a sequence of an occurrence of sharing.

As previously described, in case that a page in a certain locality set is referred to by other locality sets, other locality sets chains the common page management table in accordance with a replacement algorithm, and have the position information of the actual buffer;

(1) in the page management table of the actual buffer, a management table for managing the position information of the common page management table is provided; and, (2) the common page management table is chained in a sequence of an occurrence of a sharing to the page management table of the actual buffer.

As a result, even when the shared page is swept out from the sharingly used locality set in accordance with the replacement algorithm while the respective locality sets hold the data base reference pattern of the self locality set, the locality set for holding the actual buffer is selected from the sharingly used locality set group, and thus, the management of the shared page can be performed without an useless process by merely transferring the position information of the common page management table to the locality set in question.

Referring now to the drawings, a second preferred embodiment according to the invention will be described in detail.

Figure 5:
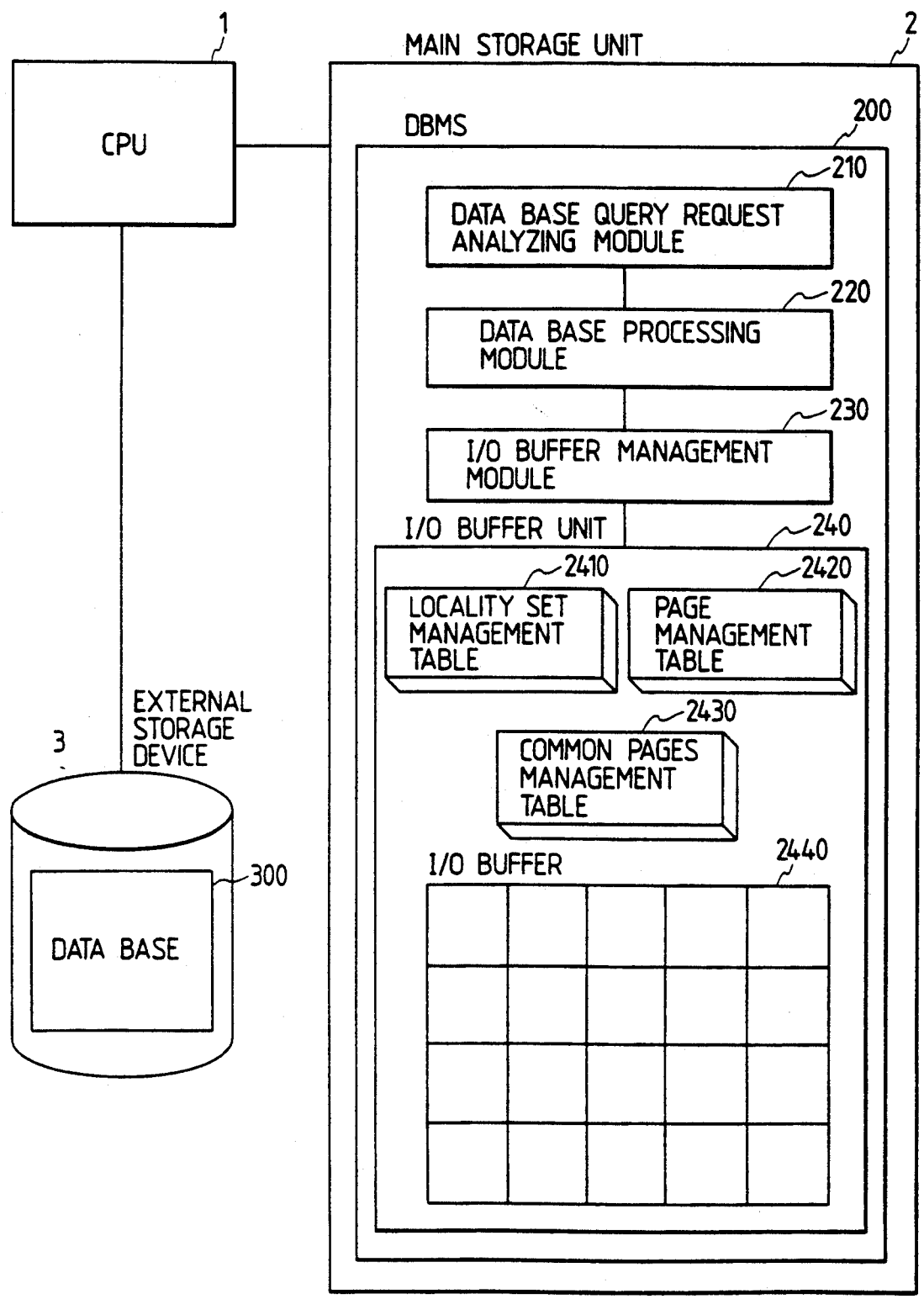

FIG. 5 is a schematic block diagram of an overall arrangement of the second preferred embodiment of the invention. Reference numeral 1 denotes a central processing unit (CPU), reference numeral 2 indicates a main storage, and reference numeral 3 represents an external storage such as a magnetic disk. There is employed a data base management system 200 on the main storage 2. The data base management system 200 is constructed of a data base query request analyzing module 210 for analyzing the grammar and the meaning of a data base query; a data base processing module 220 for performing a data base processing (for instance, a selection, a join and so on) in response to the data base query; an input/output buffer management module 230 for controlling a data buffering operation of a data base 300 which has been stored in the external storage 3 in response to the data input/output request furnished from the data base processing module; and, an input/output buffer unit 240 including input/output buffers required for performing the data buffering operations of the data base 300, and also a table for managing these input/output buffers.

In the relational data base, the data is arranged by a logical data structure which is called "a table" constructed of a plurality of records. The table is subdivided into a plurality of pages having a physically fixed length as an input/output unit of the data base management system, and these pages are stored into the external storage 3. The input/output buffer unit 240 shown in FIG. 5 is constructed of a locality set management table 2410 for subdividing and managing the buffer for every data base query; a page management table 2420 for holding the position information and page number on the main storage in accordance with the buffer for storing the page; a common page management table 2430 for managing a shared page in case the page is sharingly used between a plurality of locality sets; and, an input/output buffer 2440 for storing the data of the data base for every page.

Figure 6:
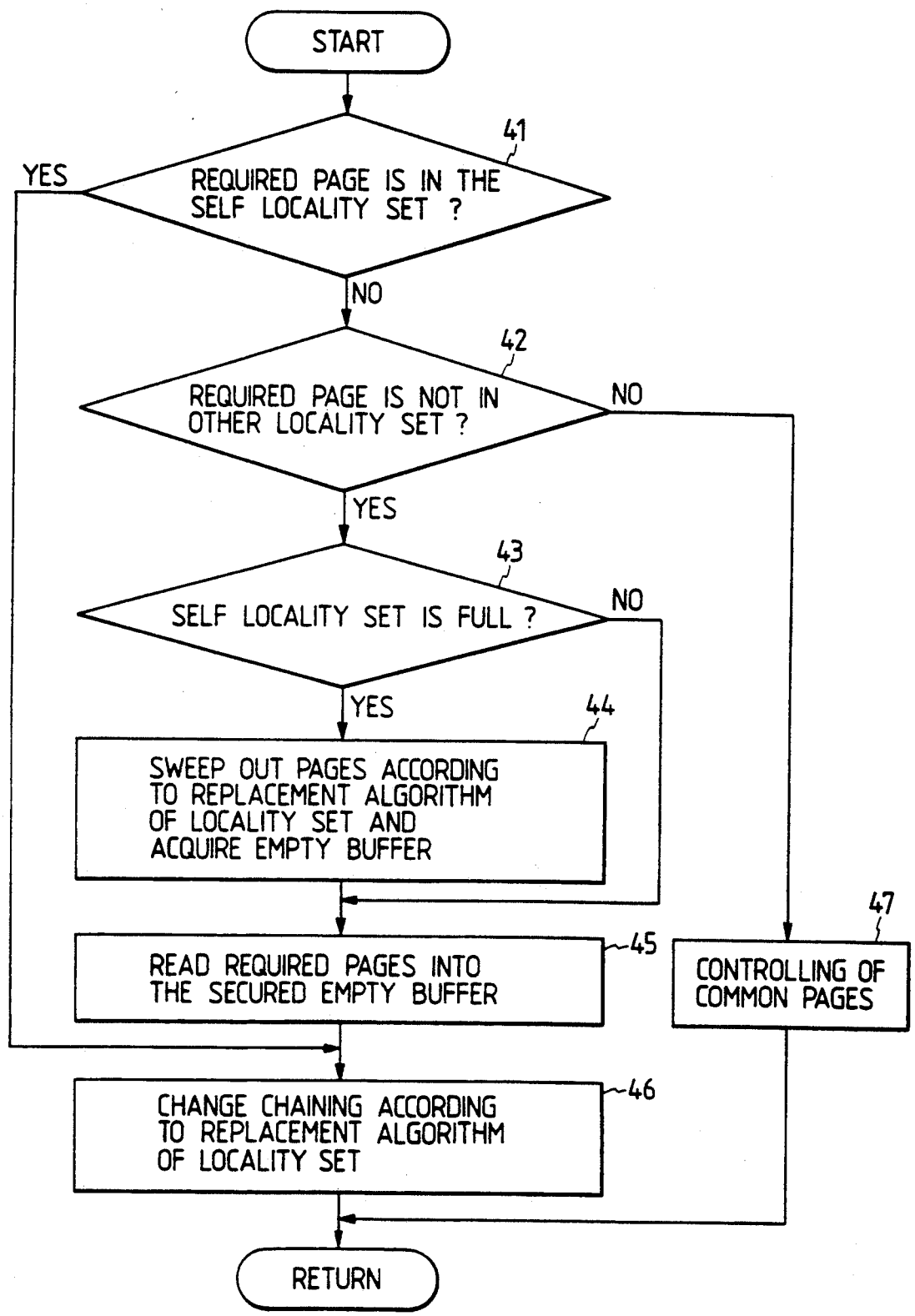

Then, FIG. 6 is a flowchart for explaining a process of the input/output buffer managing module 230 under the following conditions. That is to say, the data base management system 200 shown in FIG. 5 allocates (locality set) the buffer having a proper amount from the input/output buffer 2440 for every data base query, determines the replacement algorithm in accordance with the data base reference pattern of the data base query, and controls the input/output operations of the data with respect to the locality set.

First, when the data base processing module 220 shown in FIG. 5 requests a certain page to the input/output buffer management module 230, this input/output buffer management module 230 searches the pages which have been stored in the buffer in the locality set allocated by the data base query in question. If the requested page is contained in the self locality set (step 41), then the buffer chain is changed in accordance with the replacement algorithm of the self locality set (step 46). In case that the requested page is not contained in the self locality sets other sets are searched. If the requested page is not contained in other locality sets (step 42), a check is made whether or not a page can be newly assembled in the self locality set. If the buffer of the self locality set is filled with the set size (step 43), the buffer is released in accordance with the replacement algorithm of the self locality set so as to allocate a free buffer (step 44), so that the requested page is brought from the data base to the allocated free buffer (step 45), and the buffer is chained in the locality set in accordance with the replacement algorithm of the locality set (step 46). If the locality set is not filled with the set size, after the free buffer is allocated, the requested page is brought from the data base (step 45), and the buffer is chained in the locality set in accordance with the replacement algorithm of the locality set (step 46). Also, in case that the requested page is present in other locality sets, a shared page controlling process is executed (step 47). The shared page controlling process operation at this time will now be described with reference to two examples shown in FIGS. 7 and 8.

Figure 7:
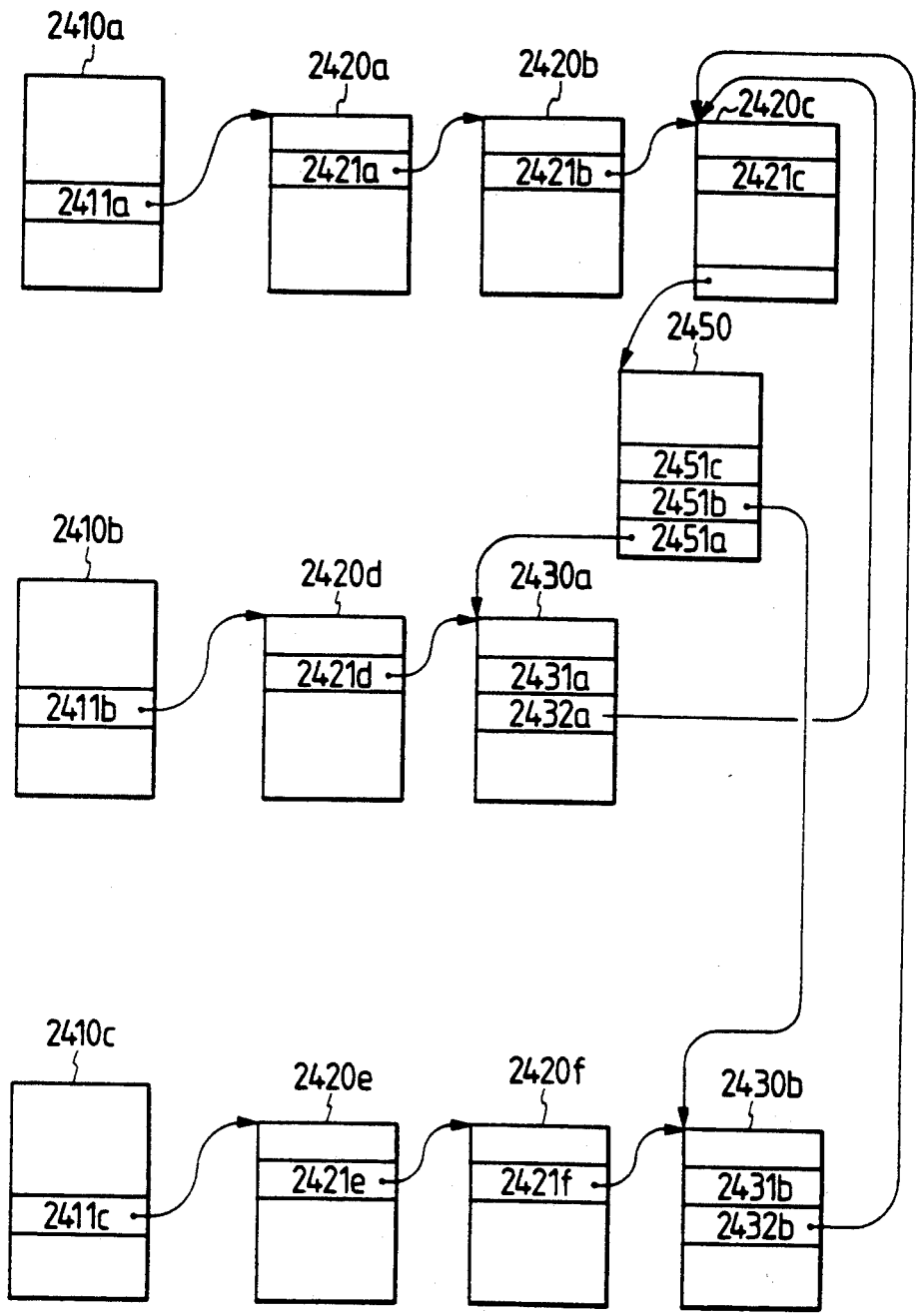

(1) Reference numerals 2410a to 2410c in FIG. 7 represent locality set management tables allocated to each of three data base queries. Into the locality set management table 2410a, three pages are brought into each of the buffers, and based upon the replacement algorithm of the locality set in question, the respective page management tables 2420a to 2420c are chained with subsequent buffer chain addresses 2421a to 2421c. An address of a head page management table of the locality set in question is designated by 2411a. Also, in the locality set management table 2410b, one page is brought into the buffer, the page management table 2420b is designated by a head page management table address 2411b, which indicates that there is no subsequent page management table in a next page management table address 2421d of the page management table 2420d (for instance "0"). It should be noted that when the locality set in question tries to refer to the pages of the page management table 2420c chained with the locality set management table 2410a, the common page management table 2430a is allocated as the subsequent page of the page management table 2420d. At this time, an address of the common page management table 2430a is set into the next page management table address of the page management table 2420d. A value indicating that there is no next page management table is set into the next page management table address of the common page management table 2430a, and an address of the page management table 2420c for managing the shared page is set into 2432a. Thereafter, a table 2450 for stacking the address of the common page management table is allocated to the page management table 2420c, and an address thereof is set into 2421c. Into a common page management table address stack table 2450, an address 2451a of the common page management table 2430a is stacked. Into the locality set management table 2410c, two pages are brought into each of the buffers and the respective page management tables 2420e and 2420f are chained with the addresses 2421e and 2421f, and an address of the head page management table 2420e is set into 2411c. In this case, when the locality set in question tries to refer to the page of the page management table 2420c which has been chained with the locality set management table 2410a, the common page management table 2430b is allocated as the subsequent page of the page management table 2420f, an address thereof is set into 2421f, and then an address of the page management table 2420c is set into 2432b. Thereafter, since a stack table 2450 of an address of the common page management table has been previously allocated to the page management table 2420c, the address 2451b of the common page management table 2430b is stacked to the table in question.

Figure 8:
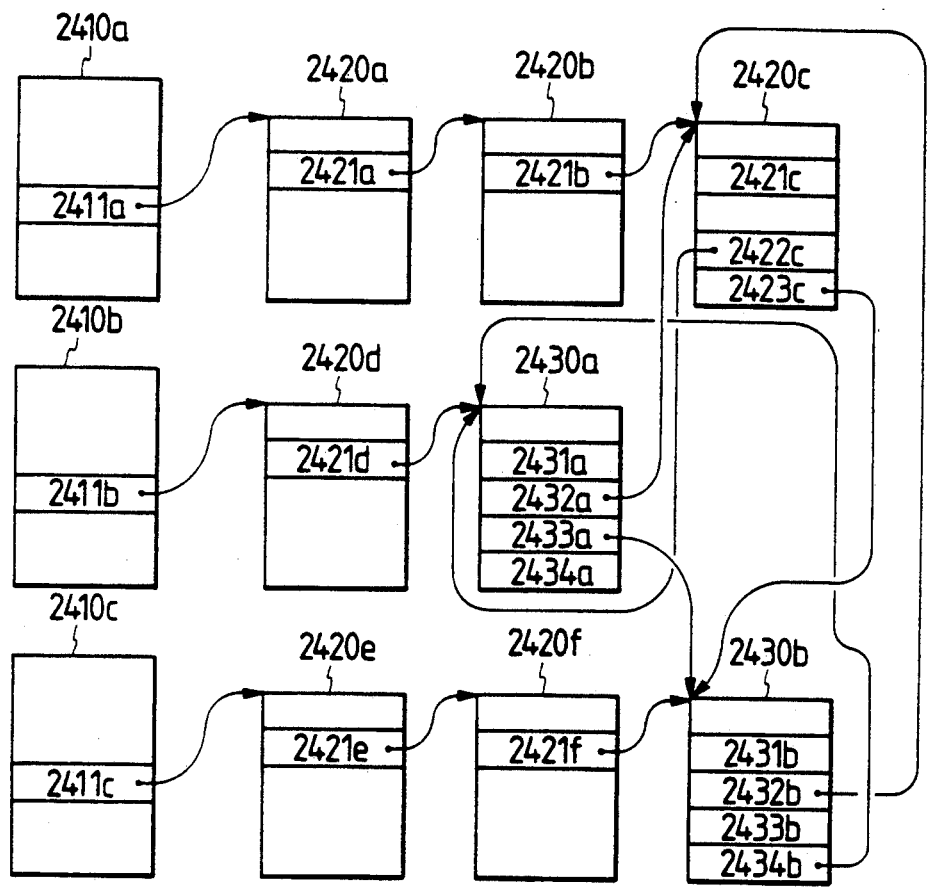

(2) A control means instead of the shared buffer control shown in FIG. 7 is represented in FIG. 8.

First, in FIG. 8, there are three locality set management tables 2410a to 2410c which are similar to those of FIG. 7. Three pages have been brought into the locality set management table 2410a. The respective page management tables 2420a to 2420c are chained with the addresses 2421a to 2421c, and an address of a head page management table 2420a is designated by 2411a from the locality set management block 2410a. Also, one page has been brought into the locality set management block 2410b; the page management table 2421d is chained with an address 2411b from the locality set management table 2410b; and an address 2421d indicates that no subsequent page management table is present. Further, two pages have been brought into the locality set management table 2410c; the respective page management tables 2420e and 2420f are chained with the addresses 2421e and 2421f; and an address of a head page management table 2420e is indicated by 2411c from the locality set management table 2410c. Under the condition, it is assumed that the locality set management tables 2410b and 2410c sequentially refer to the pages of the page management table 2420c which is chained with the locality set management table 2410a.

First, as a next page of the page management table 2420d of the locality set management table 2410b, the common page management table 2430a is allocated, and an address of the common page management table 2430a in question is designated by 2421d from the page management table 2420d. To the common page management table 2430a, an address 2432a of the page management is set. Also to the page management table 2420c of the commonly used page, both a head address 2422c and an end address 2423c of the common page management table set an address of the common page management table 2430a. To the common page management table 2430a, a value is set which indicates that there is no common page management table before and after a forward pointer 2433a and a backward pointer 2434a which chain the common page management table group. Thereafter, the common page management table 2430b is allocated as a next page of the page management table 2420f of the locality set management table 2410c, and an address of the common page management table 2430b is indicated by 2421f from the page management table 2420f. To the common page management table 2430b, an address 2432b of the page management table 2420c is set. Since the common page management table 2430a has been previously chained with the page management table 2420c of the sharingly used page, an end pointer 2423c is updated to an address of the common page management table 2430b. In addition, the forward pointer 2433a for chaining the common page management table group of the common page management table 2430a is updated to an address of the common page management table 2430b, an address of the common page management table 2430a is set to the backward pointer 2434b from the common page management table 2430b, and, a value indicating that there is no common page management table is set into the forward pointer 2433b.

In accordance with the second preferred embodiment, every time the data base query is required the input/output buffer is subdivided. Since the buffer can be managed without destroying the data reference pattern formed by the respective replacement algorithms in case that the same page is referred to between the different data base queries, there are particular advantages that the buffer search time period and the data page fetching/transferring process time period between the different data base queries can be shortened even if one data base query wishes to refer to the data page which is being referred to based upon other data base queries.

What is claimed is:

1. A data base processing method for use in a multi-user system including a central processing unit for analyzing a plurality of queries from a plurality of users so as to determine an internal processing procedure with respect to a data base, and for executing the internal processing procedure in response to a query; a main storage for said central processing unit; a secondary storage for storing data capable of being shared by each user; and an input/output control unit including at least one cache storage, for controlling a transfer of a plurality of records which are required for input/output processing operations between the central processing unit and the secondary storage; said data base processing method comprising the steps of:

(a) determining whether or not a prefetching operation is to be carried out at a start of an input/output processing operation by judging the internal processing procedure which has been formed by said query;
   (b) setting a retrieval range in which records to be fetched are stored when said prefetching operation is carried out; and
   (c) determining a unit size to be prefetched including a number of prefetching records for said input/output processing operation based on access characteristics of the internal processing procedure and also system characteristics concerning the size of the cache storage, the performance of said central processing unit, and the traffic of said input/output control unit;
   wherein a concurrency control is performed by locking a plurality of prefetched records in the cache storage before said prefetching records are accessed.

2. A data base processing method as claimed in claim 1, wherein one or a plurality of record store regions are established in the cache storage every time said query is made by a user, and the prefetching operation is carried out, based upon the designated retrieval range, on the record store region of said cache storage.

3. A data base processing method as claimed in claim 1, further comprising the steps of:
   (e) establishing a region into which at least a plurality of prefetching records are prefetched in a data base buffer in said main storage; and
   (f) controlling an unnecessary portion of said region so that said unnecessary portion of said region is sequentially replaced by another prefetching record after said prefetching records are fetched to said region.

4. A data processing method for use in a multi-user system including a central processing unit for analyzing a plurality of queries and for executing processing procedures; a main storage for said central processing unit; a secondary storage for storing data capable of being shared by each user; and an input/output control unit including at least one cache storage, for controlling a transfer of a plurality of records between the central processing unit and the secondary storage; said data base processing method comprising the steps of:

(a) forming internal processing procedures based upon information related to a storage area of target data, said information being in a query from a user;
   (b) determining whether or not a prefetching operation is to be carried out from said second storage to said cache storage at a start of an input/output processing operation by judging an internal processing procedure which has been formed at step (a);
   (c) setting a retrieval range in said secondary storage from which records are to be fetched when said prefetching operation is carried out;
   (d) determining a unit size to be prefetched including a number of prefetching records for said input/output processing operation based on access characteristics of the internal processing procedure and also system characteristics concerning the size of the cache storage, the performance of said central processing unit, and the traffic of said input/output control unit;
   (e) storing in a storage medium an address series storing records which satisfy a given retrieval condition formula;

(f) storing an address series for storing pages containing only records which do not satisfy said given retrieval condition formula;

(g) storing an address series for storing records which can not be evaluated by a given retrieval condition formula due to an overflow of the records;

(h) storing an address series for storing pages containing more than one record which can satisfy the given retrieval condition formula;

(i) editing records, which satisfy the given retrieval condition formula, into page forms which comprises designated fields; and (j) storing said pages satisfying the given retrieval condition formula.

5. A data processing method for use in a multi-user system including a central processing unit for analyzing a plurality of queries and for executing processing procedures; a main storage for said central processing unit; a secondary storage for storing data capable of being shared by each user; and an input/output control unit including at least one cache storage, for controlling a transfer of a plurality of records between the central processing unit and the secondary storage; said data base processing method comprising the steps of:

(a) forming internal processing procedures based upon information related to a storage area of target data, said information being in a query from a user;

(b) determining whether or not a prefetching operation is to be carried out from said secondary storage to said cache storage at a start of an input/output processing operation by judging an internal processing procedure which has been formed at step (a);

(c) setting a retrieval range in said secondary storage from which records are to be fetched when said prefetching operation is carried out;

(d) determining a unit size to be prefetched including a number of prefetching records for said input/output processing operation based on access characteristics of the internal processing procedure and also system characteristics concerning the size of the cache storage, the performance of said central processing unit, and the traffic of said input/output control unit;

(e) clustering records based upon one of a key value range and a hash evaluation value before start of input/output processing operations;

(f) addressing each region for storing the records which are clustered in step (e) and maintaining and managing meta data which includes a key index of at least one of a key value range and a hash evaluation value; and (g) defining a record storing range to be retrieved by utilizing the meta data.

6. A data processing method for use in a multi-user system including a central processing unit for analyzing a plurality of queries and for executing processing procedures; a main storage for said central processing unit; a secondary storage for storing data capable of being shared by each user; and an input/output control unit including at least one cache storage, for controlling a transfer of a plurality of records between the central processing unit and the secondary storage; said data base processing method comprising the steps of:

(a) forming internal processing procedures based upon information related to a storage area of target data, said information being in a query from a user;

(b) determining whether or not a prefetching operation is to be carried out from said secondary storage to said cache storage at a start of an input/output processing operation by judging an internal processing procedure which has been formed at step (a);

(c) setting a retrieval range in said secondary storage from which records are to be fetched when said prefetching operation is carried out;

(d) determining a unit size to be prefetched including a number of prefetching records for said input/output processing operation based on access characteristics of the internal processing procedure and also system characteristics concerning the size of the cache storage, the performance of said central processing unit, and the traffic of said input/output control unit;

(e) subdividing an address of said retrieval range into parallel-accessible record address series; and (f) executing an input/output process demand by employing said record address series.

7. A data base processing apparatus, comprising:

a central processing unit for analyzing a plurality of queries made from a plurality of users so as to determine an internal processing procedure with respect to a data base, and for performing the internal processing procedure in response to a query;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging the internal processing procedure which has been formed by said query;

means for setting a retrieval range in which records to be fetched are stored when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output control unit; and means for locking a plurality of prefetched records in said cache storage so as to carry out a concurrency control before said prefetching records are fetched.

8. A data base processing apparatus, comprising:

a central processing unit for analyzing a plurality of queries made from a plurality of users so as to determine an internal processing procedure with respect to a data base, and for performing the internal processing procedure in response to a query;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging the internal processing procedure which has been formed by said query;

means for setting a retrieval range in which records to be fetched are stored when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output control unit; and means for storing an address series storing records which satisfy a given retrieval condition formula;

means for storing an address series for storing pages containing at least records which do not satisfy said given retrieval condition formula;

means for storing an address series storing records which can not be evaluated by a given retrieval condition formula due to an overflow of the records;

means for storing an address series for storing pages containing at least more than one record which can satisfy the given retrieval condition formula;

means for editing records, which satisfy the given retrieval condition formula, into page forms which comprise designated fields; and means for storing said pages satisfying said given retrieval condition formula.

9. A data base processing apparatus, comprising:

a central processing unit for analyzing a plurality of queries made from a plurality of users so as to determine an internal processing procedure with respect to a data base, and for performing to the processing procedure in response to a query;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging the internal processing procedure which has been formed by said query;

means for setting a retrieval range in which records to be fetched are stored when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output control unit;

clustering means for clustering records based upon one of a key value range and a hash evaluation value before start of input/output processing operations;

means for addressing each region for storing records being clustered by said clustering means, and for maintaining and managing meta data which includes a key index of at least one of a key value range and a hash evaluation value; and means for defining a record storing range to be retrieved by utilizing the meta data.

10. A data base processing apparatus, comprising:

a central processing unit for analyzing a plurality of queries made from a plurality of users so as to determine an internal processing procedure with respect to a data base, and for performing the internal processing procedure in response to a query;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging the internal processing procedure which has been formed by said query;

means for setting a retrieval range in which said records to be fetched are stored when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output control unit;

means for subdividing an address of said retrieval range into a parallel-accessible record address series; and means for issuing an input/output process demand by employing said record address series.

11. A data processing method for use in a multi-user system including a central processing unit for analyzing a plurality of queries and for executing processing procedures; a main storage for said central processing unit; a secondary storage for storing data capable of being shared by each user; and an input/output control unit including at least one cache storage, for controlling a transfer of a plurality of records between the central processing unit and the secondary storage; said data base processing method comprising the steps of:

(a) forming internal processing procedures based upon information related to a storage area of target data, said information being in a query from a user;

(b) determining whether or not a prefetching operation is to be carried out from said secondary storage to said cache storage at a start of an input/output processing operation by judging an internal processing procedure which has been formed at step (a);

(c) setting a retrieval range in said secondary storage from which records are to be fetched when said prefetching operation is carried out;

(d) determining a unit size to be prefetched including a number of prefetching records for said input/output processing operation based on access characteristics of the internal processing procedure and also system characteristics concerning the size of the cache storage, the performance of said central processing unit, and the traffic of said input/output control unit;

wherein a concurrency control is performed by locking a plurality of prefetched records in the cache storage before said prefetching records are accessed.

12. A data base processing apparatus, comprising:

a central processing unit for forming a plurality of internal processing procedures, based on a plurality of queries from a plurality of users, respectively so as to determine internal processing procedures with respect to a data base, and for performing the internal processing procedures;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging at least one of the internal processing procedures which has been formed by said central processing unit;

means for setting a retrieval range in said secondary storage from which records are to be fetched when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output control unit;

means for storing an address series storing records which satisfy a given retrieval condition formula;

means for storing an address series for storing pages containing only records which do not satisfy said given retrieval condition formula;

means for storing an address series storing records which can not be evaluated by a given retrieval condition formula due to an overflow of the records;

means for storing an address series for storing pages containing more than one record which can satisfy the given retrieval condition formula;

means for editing records, which satisfy the given retrieval condition formula, into page forms which comprise designated fields; and means for storing said pages satisfying said given retrieval condition formula.

13. A data base processing apparatus, comprising:

a central processing unit for forming a plurality of internal processing procedures, based on a plurality of queries from a plurality of users, respectively so as to determine internal processing procedures with respect to a data base, and for performing the internal processing procedures;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging at least one of the internal processing procedures which has been formed by said central processing unit;

means for setting a retrieval range in said secondary storage from which records are to be fetched when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output control unit;

means for clustering records based upon said information related to storage areas as a key value range and a hash evaluation value;

means for addressing each region for storing the records which are clustered by said clustering means, and maintaining and managing meta data which includes a key index of at least one of a key value range and a hash evaluation value; and means for defining a record storing range to be retrieved by utilizing the meta data.

14. A data base processing apparatus, comprising:

a central processing unit for forming a plurality of internal processing procedures, based on a plurality of queries from a plurality of users, respectively so as to determine internal processing procedures with respect to a data base, and for performing the internal processing procedures;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging at least one of the internal processing procedures which has been formed by said central processing unit;

means for setting a retrieval range in said secondary storage from which records are to be fetched when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output control unit;

means for subdividing an address of said retrieval range into parallel-accessible record address series; and means for executing an input/output process demand by employing said record address series.

15. A data base processing apparatus, comprising:

a central processing unit for forming a plurality of internal processing procedures, based on a plurality of queries from a plurality of users, respectively so as to determine internal processing procedures with respect to a data base, and for performing the internal processing procedures;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging at least one of the internal processing procedures which has been formed by said central processing unit;

means for setting a retrieval range in said secondary storage from which records are to be fetched when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output control unit;

means for locking a plurality of records prefetched on said cache storage before the prefetching records are accessed, so as to execute a concurrency control.

16. A data base processing apparatus, comprising:

a central processing unit for forming a plurality of internal processing procedures, based on a plurality of queries from a plurality of users, respectively so as to determine internal processing procedures with respect to a data base, and for performing the internal processing procedures;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging at least one of the internal processing procedures which has been formed by said central processing unit;

means for setting a retrieval range in said secondary storage from which records are to be fetched when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output control unit;

means for storing an address series storing records which satisfy a given retrieval condition formula;

means for storing an address series for storing pages containing at least records which do not satisfy said given retrieval condition formula;

means for storing an address series for storing records which can not be evaluated by a given retrieval condition formula due to an overflow of the records;

means for storing an address series for storing pages containing more than one record which can satisfy the given retrieval condition formula;

means for editing records, which satisfy the given retrieval condition formula, into page forms which comprise designated fields; and means for storing said pages satisfying said given retrieval condition formula.

17. A data base processing apparatus, comprising:

a central processing unit for forming a plurality of internal processing procedures, based on a plurality of queries from a plurality of users, respectively so as to determine internal processing procedures with respect to a data base, and for performing the internal processing procedures;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging at least one of the internal processing procedures which has been formed by said central processing unit;

means for setting a retrieval range in said secondary storage from which records are to be fetched when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output control unit;

clustering means for clustering records based upon one of a key value range and a hash evaluation value;

means for addressing each region for storing records being clustered by said clustering means, and for maintaining and managing meta data which includes key index of at least one of a key value range and a hash evaluation value; and means for defining a record storing range to be retrieved by utilizing the meta data.

18. A data base processing apparatus, comprising:

a central processing unit for forming a plurality of internal processing procedures, based on a plurality of queries from a plurality of users, respectively so as to determine internal processing procedures with respect to a data base, and for performing the internal processing procedures;

a main storage for said central processing unit;

a secondary storage for storing data capable of being shared by each user;

an input/output control unit including at least one cache storage, for controlling a transfer of a plurality of records which are required for input/output processing operations between the central processing unit and the secondary storage;

means for determining whether or not a prefetching operation is carried out at a start of an input/output processing operation by judging at least one of the internal processing procedures which has been formed by said central processing unit;

means for setting a retrieval range in said secondary storage from which records are to be fetched when said prefetching operation is carried out;

means for determining a unit size to be prefetched including a number of prefetching records for said input/output processing operation based on access characteristics of the internal processing procedure and also system characteristics concerning the size of the cache storage, the performance of a central processing unit, and the traffic of said input/output unit;

means for subdividing an address representative of said retrieval range to be retrieved into parallel-accessible record address series; and means for issuing an input/output process demand by employing said record address series.

* * * * *